(12) United States Patent
Nishio

(10) Patent No.: US 12,610,152 B2
(45) Date of Patent: Apr. 21, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Taisuke Nishio, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 282 days.

(21) Appl. No.: 18/300,144

(22) Filed: Apr. 13, 2023

(65) Prior Publication Data

US 2023/0345136 A1      Oct. 26, 2023

(30) Foreign Application Priority Data

Apr. 25, 2022    (JP) ................................. 2022-071728

(51) Int. Cl.
*H04N 23/88* (2023.01)
(52) U.S. Cl.
CPC ................................... *H04N 23/88* (2023.01)
(58) Field of Classification Search
CPC ............ H04N 23/88; H04N 9/73; H04N 9/64; H04N 23/70; H04N 23/81
See application file for complete search history.

(56) References Cited

U.S. PATENT DOCUMENTS

2016/0007001 A1* 1/2016 Kuchiki ................. H04N 23/88
348/223.1

FOREIGN PATENT DOCUMENTS

| JP | 2005130317 A | 5/2005 |
| WO | 2017/066263 A1 | 4/2017 |
| WO | 2021/104352 A1 | 6/2021 |

* cited by examiner

*Primary Examiner* — Christopher K Peterson
(74) *Attorney, Agent, or Firm* — Canon U.S.A., Inc. IP Division

(57) ABSTRACT

An image processing apparatus includes at least one processor, and a memory coupled to the at least one processor and storing instructions that, when executed by the processor, cause the processor to function as an adjustment unit configured to adjust a color of an input image based on a correction level defining a degree to which the color of the input image is to be corrected, a calculation unit configured to calculate a first white balance control value based on the input image, an evaluation unit configured to evaluate whether the first white balance control value is valid, and a setting unit configured to set a second white balance control value based on an evaluation result by the evaluation unit, wherein the evaluation unit determines an evaluation criterion for evaluating whether the first white balance control value is valid based on the correction level determined by the adjustment unit.

19 Claims, 11 Drawing Sheets

IMAGE PROCESSING APPARATUS, IMAGE PROCESSING METHOD, AND STORAGE MEDIUM

BACKGROUND OF THE INVENTION

Field of the Invention

The present disclosure relates to a technique for processing an image captured by an imaging apparatus.

Description of the Related Art

Conventionally, an imaging apparatus is known which is configured such that white balance (hereinafter referred to as WB) control is performed in a state in which infrared light is sensed by an image sensor, and a resulting color image is output.

Normally, the imaging apparatus is designed such that in order to form the color of an image by visible light only, an infrared cut-off filter (hereinafter referred to as an IRCF) is placed on the optical axis, thereby receiving only visible light without receiving infrared light. On the other hand, there is an imaging apparatus that has a mode in which the sensitivity of the image sensor is increased by removing the IRCF from the optical axis such that infrared light is sensed when shooting in a low-illuminance environment. However, as described above, since the color of the imaging apparatus is designed with the assumption that infrared light is not received, the reception of infrared light may cause the color of the color image to shift. More specifically, the color of the captured image becomes reddish compared to a state in which no infrared light is received. That is, the color reproducibility of the imaging apparatus is degraded.

To handle the above situation, Japanese Patent Laid-Open No. 2005-130317 discloses a technique for switching the white balance control mode according to the position of the IRCF. According to Japanese Patent Laid-Open No. 2005-130317, depending on the position of the IRCF, the white balance control mode is switched such that the ratio of the integrated values of the RGB (red, green, and blue) components over the entire screen is equal to a prestored ratio or equal to 1:1:1. This improves the color reproducibility of the imaging apparatus.

As the image sensors have become more sensitive in recent years, visible light components can be captured even when the exposure is reduced by an amount corresponding to the amount of infrared light captured in the state in which the IRCF is removed, and thus it becomes possible to retain color information of the subject when the IRCF is removed. In other words, the increase in the sensitivity of the image sensor makes it possible to easily obtain a captured image in which visible light components and infrared light components are mixed.

SUMMARY OF THE INVENTION

In an aspect of the present disclosure, there is provided an image processing apparatus including at least one processor, and a memory coupled to the at least one processor and storing instructions that, when executed by the processor, cause the processor to function as an adjustment unit configured to adjust a color of an input image based on a correction level defining a degree to which the color of the input image is to be corrected, a calculation unit configured to calculate a first white balance control value based on the input image, an evaluation unit configured to evaluate whether or not the first white balance control value is valid, and a setting unit configured to set a second white balance control value based on a result of the evaluation by the evaluation unit, wherein the evaluation unit determines an evaluation criterion for evaluating whether or not the first white balance control value is valid based on the correction level determined by the adjustment unit.

Further features of the present invention will become apparent from the following description of embodiments with reference to the attached drawings.

DESCRIPTION OF THE EMBODIMENTS

Embodiments of the present disclosure are described below with reference to drawings.

Note that these embodiments are described by way of example only, and that these embodiments do not limit the scope of the present disclosure. Also note that all of the features described in the embodiments are not necessarily needed to practice the disclosure. The configuration of the embodiments may be modified or changed as appropriate depending on the specifications and various conditions (usage conditions or environments or the like) of the apparatus according to the present disclosure. Furthermore, the embodiments may be combined in part as appropriate. In the following description of the embodiments, the same elements are denoted by the same reference numbers/symbols.

First Embodiment

Figure 1:
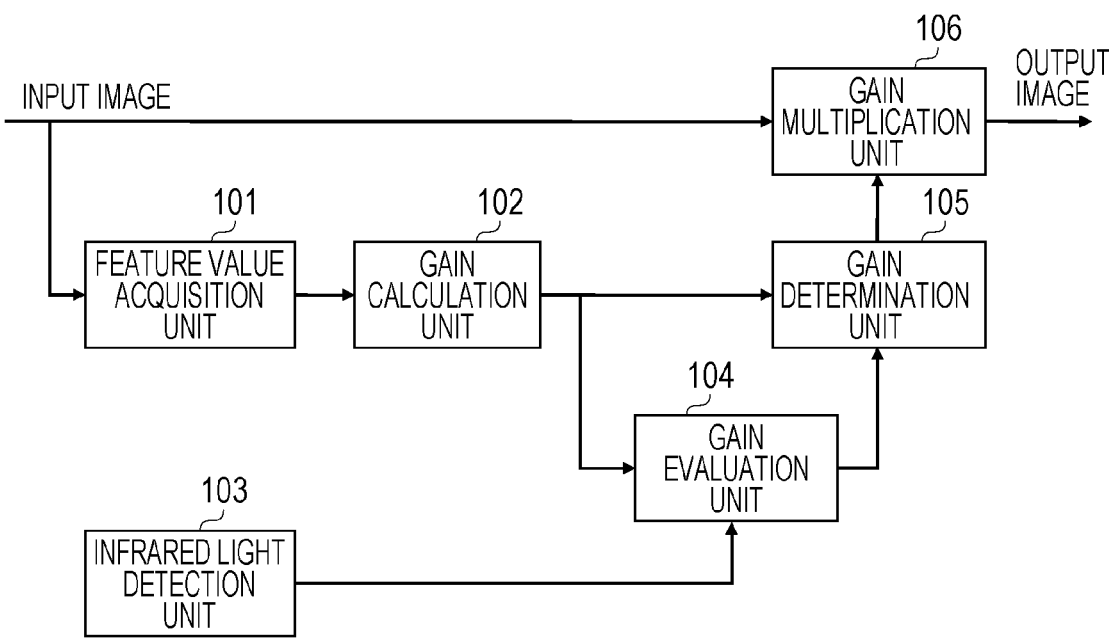
FIG. 1 is a diagram illustrating an example of a configuration of an image processing apparatus according to a first embodiment.

FIG. 1 is a diagram illustrating an example of a configuration of an image processing apparatus according to a first embodiment.

Referring to FIG. 1, the image processing apparatus according to the first embodiment is described below. The image processing according to the present embodiment is assumed to be an apparatus built into or connected to an imaging apparatus such as a digital camera, a surveillance camera, or the like.

An input image is an image captured by an imaging unit including a lens and an image sensor (not shown). The input image is given in the form of image data (or image signal) including a plurality of pixels and containing information of a plurality of colors. The plurality of colors are, for example, red (R), green (G), and blue (B). The image data corresponds to the amount of light that has passed through the filters corresponding to the respective color provided on the image sensor and has been converted into electric signals by the image sensor. Color filters transmit not only visible light corresponding to red, green, and blue, but also some infrared light (invisible light). Therefore, an imaging apparatus usually has an infrared light cut-off filter (IRCF) to remove infrared light components to obtain an image close to human vision. The image sensor includes an imaging element such as a CMOS (Complementary Metal Oxide Semiconductor) sensor or a CCD (Charge-Coupled Device) sensor.

An output image is an image obtained such that the white balance is appropriately corrected by multiplying the pixel values of the input image by a white balance gain, which is a white balance control value obtained by a process described later. In the following description, the white balance will also be referred to simply as WB. In the present embodiment, as described in detail below, the image processing apparatus properly performs the white balance control (the WB control) according to whether the input image is affected by infrared light captured by the image sensor, thereby obtaining an output image with properly corrected white balance.

A feature value acquisition unit 101 acquires a feature value related to the color of the input image and outputs the acquired feature value to the gain calculation unit 102. More specifically, the feature value acquisition unit 101 acquires color information for each rectangular area determined by the image data included within each rectangular area, when the input image is divided into a plurality of rectangular areas. The color information is, for example, a representative value of color difference signals for each rectangular area, where the representative value is, for example, an average value or a mode value.

The gain calculation unit 102 calculates a first white balance control value according to the feature value of the input image. For example, the gain calculation unit 102 acquires color information for each area from the feature value acquisition unit 101 and calculates a representative value of the color information of the input image. The gain calculation unit 102 then calculates, as the first white balance control value, a white balance gain (hereinafter referred to as a WB gain) that causes the representative value of the color information of the output image to be equal to a predetermined target value. In the present embodiment, it is assumed by way of example that the WB gain used for the white balance control includes a red gain component for adjusting the redness of an image (hereinafter referred to simply as the red gain component) and a blue gain component for adjusting the blueness of the image (hereinafter referred to simply as the blue gain component). The information on the WB gain calculated by the gain calculation unit 102 is sent to the gain evaluation unit 104 and gain determination unit 105.

The infrared light detection unit 103 detects the effect of the infrared light on the color of the input image. That is, the infrared light detection unit 103 detects whether or not the color of the input image is affected by the infrared light captured by the image sensor, and outputs the detection result to the gain evaluation unit 104. For example, the infrared light detection unit 103 detects that when the IRCF (not shown) is inserted on the optical axis of the lens of the imaging unit, the color of the input image is not affected by infrared light. On the other hand, the infrared light detection unit 103 detects that when the IRCF is not inserted on the optical axis of the lens of the imaging unit (away from the optical axis), the color of the input image is affected by the infrared light.

The gain evaluation unit 104 determines, based on the detection result acquired from the infrared light detection unit 103, the evaluation criterion for evaluating whether the WB gain (the first white balance control value) acquired from the gain calculation unit 102 is valid or not. The gain evaluation unit 104 then evaluates whether or not the WB gain (the first white balance control value) acquired from the gain calculation unit 102 is valid according to the evaluation criterion, and sends the evaluation result to the gain determination unit 105. That is, the gain evaluation unit 104 evaluates whether the WB gain (the first white balance control value) is valid or not based on a different evaluation criterion between the case where the color of the input image is not affected by infrared light and the case where it is affected by infrared light. In the present embodiment, as will be described in further detail later, the gain evaluation unit 104 uses a predetermined area A1 and a predetermined area A2 of the WB gain as the evaluation criterion. For example, in a case where, when the color of the input image is not affected by infrared light and the WB gain obtained from the gain calculation unit 102 is within the predetermined area A1, the gain evaluation unit 104 evaluates that the WB gain is valid. On the other hand, in a case where, when the color of the input image is affected by infrared light and the WB gain obtained from the gain calculation unit 102 is within the predetermined area A2 different from the predetermined area A1, the gain evaluation unit 104 evaluates that the WB gain is valid.

As will be described in further detail later with reference to FIGS. 3 to 6, the predetermined area A1 indicates a valid range of the WB gain when the color of the input image is not affected by infrared light, and the area A2 indicates a valid range of the WB gain when the color of the input image is affected by infrared light. More specifically, the predetermined area A1 indicates a valid range of the WB gain in the state in which only visible light is captured by the image sensor, that is, the IRCF is inserted on the optical axis so as not to capture infrared light. On the other hand, the position of the predetermined area A2 is designed according to the sensitivity of the image sensor and according to whether the color of the input image is affected by infrared light. That is, the ratio of infrared light to visible light captured by the image sensor in the state in which the IRCF is removed depends on the ratio of infrared light to visible light in the imaging environment and the ratio of the infrared light sensitivity to the visible light sensitivity of the image sensor. Therefore, in the present embodiment, the position of the predetermined area A2 is designed such that as the sensitivity of the image sensor increases, the predetermined area A2 includes portions that are further away from the position of the predetermined area A1. In other words, the predetermined area A2 is designed such that the higher the sensitivity of the image sensor, the greater the difference between the WB gain when the input image color is not affected by infrared light and the WB gain when the input image color is affected by infrared light.

The gain determination unit 105 determines a final white balance control value (a final WB gain) which is to be multiplied to the input image by the gain multiplication unit 106, which will be described later. As described in detail below, the gain determination unit 105 determines the final WB gain based on the result of the evaluation by the gain evaluation unit 104 or the evaluation criterion used by the gain evaluation unit 104. In the present embodiment, the final WB gain to be multiplied to the input image by the gain multiplication unit 106 is given by the WB gain (the first white balance control value) obtained from the gain calculation unit 102 or the second white balance control value which is a predetermined white balance control value. The gain determination unit 105 acquires the WB gain (the first white balance control value) from the gain calculation unit 102, and also acquires the evaluation result of whether the WB gain is valid or not from the gain evaluation unit 104. The gain determination unit 105 then determines the final WB gain and outputs it to the gain multiplication unit 106. More specifically, when the evaluation result obtained from the gain evaluation unit 104 indicates that the WB gain is valid, the gain determination unit 105 sets the first white balance control value calculated by the gain calculation unit 102 as the final white balance control value and outputs it to the gain multiplication unit 106. On the other hand, when the evaluation result obtained from the gain evaluation unit 104 indicates that the WB gain is not valid, the gain determination unit 105 sets the predetermined white balance control value (the second white balance control value) as the final WB gain and outputs it to the gain multiplication unit 106. Note that the second white balance control value is, for example, a WB gain stored in a storage apparatus (not shown). The WB gain stored in the storage apparatus may be, for example, a WB gain used as a final WB gain in the past, a predetermined WB gain included within a predetermined area A1 or A2, or the like.

The gain multiplication unit 106 acquires the final WB gain from the gain determination unit 105 and multiplies the input image by the final WB gain thereby generating an output image that has been subjected to the white balance control.

Figure 2:
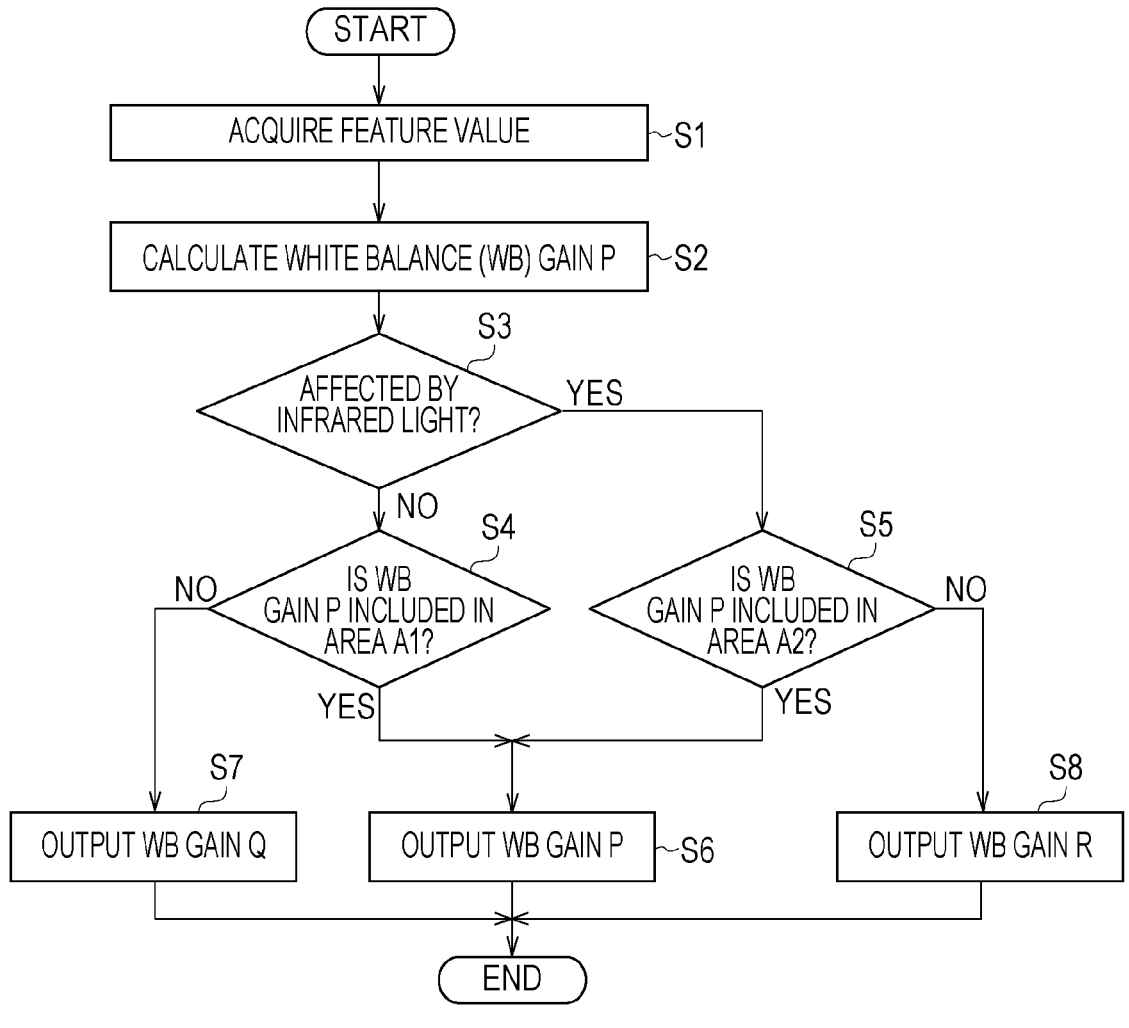
FIG. 2 is a flowchart illustrating a flow of processing performed by main components of an image processing apparatus according to the first embodiment.

FIG. 2 is a flowchart illustrating a flow of the main parts of image processing performed by the image processing apparatus according to the present embodiment. An example of image processing according to the present embodiment is described below with reference to the flowchart shown in FIG. 2. In the following description with reference to the flowchart, each processing step is denoted by a numerical number prefixed with "S".

First, in S1, the feature value acquisition unit 101 acquires a feature value of the color of the input image.

Next, in S2, the gain calculation unit 102 calculates a WB gain P as a first white balance control value based on the feature value acquired in S1.

Next, in S3, the infrared light detection unit 103 detects whether or not the color of the input image is affected by the infrared light captured by the image sensor. In a case where the infrared light detection unit 103 detects that the color of the input image is not affected by infrared light, the process proceeds to S4. However, in a case where the infrared light detection unit 103 detects that the color of the input image is affected by infrared light, the process proceeds to S5.

When the process proceeds to S4, the gain evaluation unit 104 evaluates whether or not the WB gain P is included in the area A1. In a case where the WB gain P is included in the area A1, the gain evaluation unit 104 evaluates that the WB gain P is valid, and the process proceeds to S6. However, in a case where the WB gain P is not included in the area A1, the gain evaluation unit 104 evaluates that the WB gain P is not valid, and the process proceeds to S7.

When the process proceeds to S5, the gain evaluation unit 104 evaluates whether or not the WB gain P is included in the area A2. In a case where the WB gain P is included in the area A2, the gain evaluation unit 104 evaluates that the WB gain P is valid, and the process proceeds to S6. In a case where the WB gain P is not included in the area A2, the gain evaluation unit 104 evaluates that the WB gain P is not valid, and the process proceeds to S8.

When the process proceeds to S6, the gain determination unit 105 outputs the WB gain P (the first white balance control value) as the final WB gain to the gain multiplication unit 106.

In the case where the process proceeds to S7, the gain determination unit 105 outputs the WB gain Q as the predetermined white balance control value (the second white balance control value), that is, as the final WB gain, to the gain multiplication unit 106. A further description of the WB gain Q will be given later.

When the process proceeds to S8, the gain determination unit 105 determines the WB gain R as the predetermined white balance control value (the second white balance control value), that is, as the final WB gain, and outputs it to the gain multiplication unit 106. A further description of the WB gain R will be given later.

The white balance gain control according to the present embodiment and its effects are described below.

Figure 3:
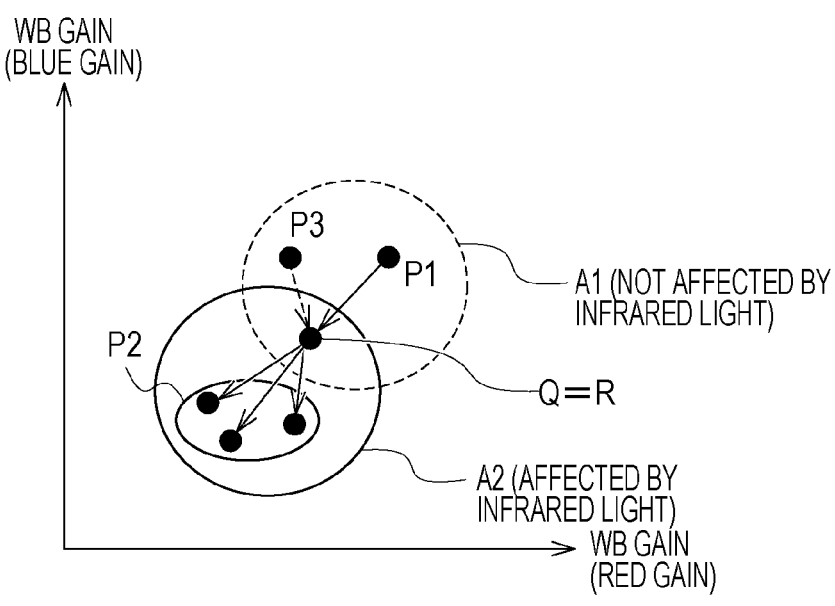
FIG. 3 is a diagram illustrating an example of a first WB gain control according to the first embodiment.

FIG. 3 is a diagram illustrating an example of a first WB control as an example of a white balance gain control according to the present embodiment.

In FIG. 3, a predetermined area A1 indicates a valid range of the area of the WB gain for a case where the color of the input image is not affected by infrared light. Hereinafter, this area A1 is referred to simply as the valid area A1. A predetermined area A2 indicates a valid range of the area of the WB gain for a case where the color of the input image is affected by infrared light. Hereinafter, this range area A2 is referred to simply as the valid area A2. In the present embodiment, the valid range area is designed such that when the WB gain within the valid range is applied to the input image, an appropriate white balance control is achieved without causing an unnatural feeling to a user. That is, in a case where the color of the input image is not affected by infrared light, when a WB gain belonging to the valid area A1 is applied to the input image, it is possible to prevent the loss of the white balance that may cause deterioration of the image quality. In a case where the color of the input image is affected by infrared light, when a WB gain belonging to the valid area A2 is applied to the input image, it is possible to prevent the loss of the white balance that may cause deterioration of the image quality.

In FIG. 3, WB gains P1, P2, P3, Q, and R each represent a WB gain. The WB gain P1 indicates a WB gain calculated for a case where the color of the input image is not affected by infrared light, while WB gains P2 and P3 are WB gains calculated for a case where the color of the input image is affected by infrared light. FIG. 3 shows three examples WB gain relating to WB gain P2. Of the three examples of WB gain included in the WB gain P2, a WB gain which is most suitable for the lighting conditions in the shooting environment is selected and is applied to the input image. On the other hand, the WB gain P3 is a WB gain outside the valid area A2 in a case where the color of the input image is affected by infrared light, and this WB gain is not applied to the input image. The WB gain Q is a WB gain that is within the valid area A1 and is to be applied to the input image when the color of the input image is not affected by infrared light instead of a WB gain calculated from the feature value of the input image in a case where this calculated WB gain is outside the valid area A1. On the other hand, the WB gain R is a WB gain that is within the valid area A2 and is to be applied to the input image when the color of the input image is affected by infrared light instead of a WB gain calculated from the feature value of the input image in a case where this calculated WB gain is outside the valid area A2. In this specific example, the WB gain Q and the WB gain R both belong to a common area of the valid areas A1 and A2, and Q=R. In practice, if the WB gain is changed abruptly with time, the user may have an unnatural feeling, and thus control is performed such that the WB gain is changed gradually with time to a target WB gain, which may be one of the WB gains P1, P2, Q, or R.

Note that in conventional white balance control, the valid range of the WB gain is fixed regardless of whether the color of the input image is affected by infrared light or not. Therefore, when the color of the input image is affected by infrared light, the WB gain optimal for the lighting conditions of the shooting environment such as those shown in WB gain P2 in FIG. 3 cannot be used. Instead, the WB gain P3 is used as the WB gain. Therefore, in a case where the difference between the WB gain actually applied and the optimal WB gain is large, the white balance may be lost and image quality may deteriorate.

In contrast, in the white balance control according to the present embodiment, the valid range of the WB gain is variable depending on whether or not the color of the input image is affected by infrared light. Therefore, in the present embodiment, in a case where the color of the input image is affected by infrared light, the WB gain optimal for the lighting conditions in the shooting environment, such as the WB gain P2 shown in FIG. 3, can be used. In addition, in the case where the color of the input image is affected by infrared light, even when the calculated WB gain P3 is outside the valid range, a WB gain R within the valid range is applied instead, which prevents the loss of the white balance and deterioration of the image quality.

In addition, in the white balance control according to the present embodiment, the valid area A2 of the WB gain for the case where the color of the input image is affected by infrared light is designed to be adapted depending on the sensitivity of the image sensor. That is, in the present embodiment, the position of the valid WB gain area A2 is designed such that as the sensitivity of the image sensor increases, the valid WB gain area A2 includes portions that are further away from the position of the valid WB gain area A1.

Here, the lower the illumination, the greater the ratio of the infrared light component to the visible light component in the shooting environment, and thus the greater the redness of the captured image. To correct the strong reddish color in the captured image, it is necessary to apply a WB gain that is significantly different from the WB gain used in the case where the color of the input image is not affected by infrared light. The higher the sensitivity of the image sensor, the higher the SN, even in low-illuminance environments, and the closer the color of the captured image to the true color of the subject. As described above, the higher the sensitivity of the image sensor, the better the color reproduction can be achieved by more actively controlling the white balance in low-illuminance environments, even when the color of the input image is affected by infrared light. On the other hand, if the white balance is actively controlled when the sensitivity of the image sensor is insufficient, the white balance may be greatly degraded by noise. That is, in a case where the sensitivity of the image sensor is insufficient, even when the color of the input image is affected by infrared light, it is possible to prevent a significant loss of the white balance by using a WB gain which is slightly different from a WB gain used in a case where the color of the input image is not affected by infrared light.

In view of the above, according to the present embodiment, the white balance control is performed such that the higher the sensitivity of the image sensor, the more actively the white balance is controlled even when the color of the input image is affected by infrared light. That is, according to the present embodiment, the white balance control is performed such that the higher the sensitivity of the image sensor, the greater the difference in WB gain from the WB gain which is applied when the color of the input image is not affected by infrared light. This prevents the significant loss of the white balance, while achieving the improvement in the color reproducibility of the captured image in low-illuminance conditions.

In the present embodiment, it is assumed that the infrared light detection unit 103 detects whether the IRCF is in the inserted or removed state, but this is merely an example. For example, in a case where the imaging apparatus is equipped with an infrared lighting unit (not shown), the detection of whether or not the color of the input image is affected by infrared light may be made according to whether the infrared lighting unit is in the turned-on or turned-off state. That is, in a case where the infrared lighting unit is emitting infrared light, it is detected that the color of the input image is affected by infrared light, while in a case where the infrared lighting unit is not emitting infrared light, it is detected that the color of the input image is not affected by infrared light. Alternatively, the user may set whether or not the color of the input image is affected by infrared light. That is, a WB control mode used when the color of the input image is affected by infrared light and a WB control mode used when the color of the input image is not affected by infrared light may be provided and the user may select either WB control mode.

The gain determination unit 105 may output the WB gain Q or the WB gain R to the gain multiplication unit 106 only at the time when a change occurs in the detection result of the infrared light detection unit 103. For example, let it be assumed that the WB gain calculated by the gain calculation unit 102 in a state in which the color of the input image is affected by infrared light is outside the range of the valid area A2. In this case, when the WB gain calculated in the past and currently used is within the range of the valid area A2, the gain determination unit 105 outputs not the WB gain R but the currently used WB gain. On the other hand, at the time when the IRCF is removed, since the currently used WB gain has been calculated when the IRCF is in the inserted state and thus it is within the valid area A1, the gain determination unit 105 outputs the WB gain R within the valid area A2. That is, in the case where the color of the input image is affected by infrared light, the gain determination unit 105 outputs the WB gain R within the valid area A2 only when the currently used WB gain is outside the valid area A2.

Figure 4:
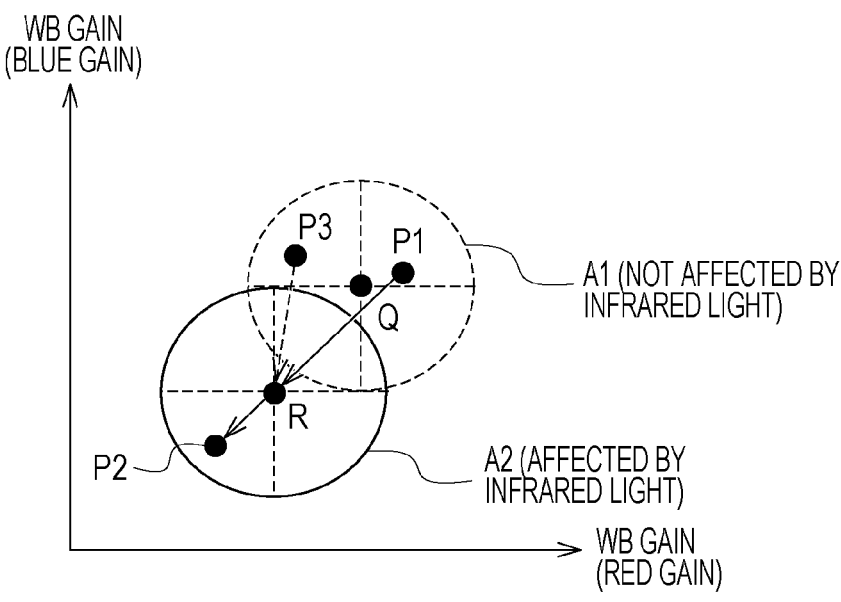
FIG. 4 is a diagram illustrating an example of a second WB gain control according to the first embodiment.

FIG. 4 is a diagram illustrating a second example of WB control according to the present embodiment.

In the second example of WB control illustrated in FIG. 4, the gain determination unit 105 sets the WB gain Q and the WB gain R at the center of the valid area A1 and the center of the valid area A2, respectively. This makes it possible to use a normal WB gain within the valid area. As a result, even when the true (optimal) WB gain is any gain within the valid area, the difference between the applied WB gain and the true (optimal) WB gain can be small enough to prevent a significant loss of the white balance. In addition, since the difference between the applied WB gain and the true (optimum) WB gain can be minimized, the WB gain can be set to the true (optimum) value in the shortest possible time when the WB gain is smoothly controlled over time.

Figure 5:
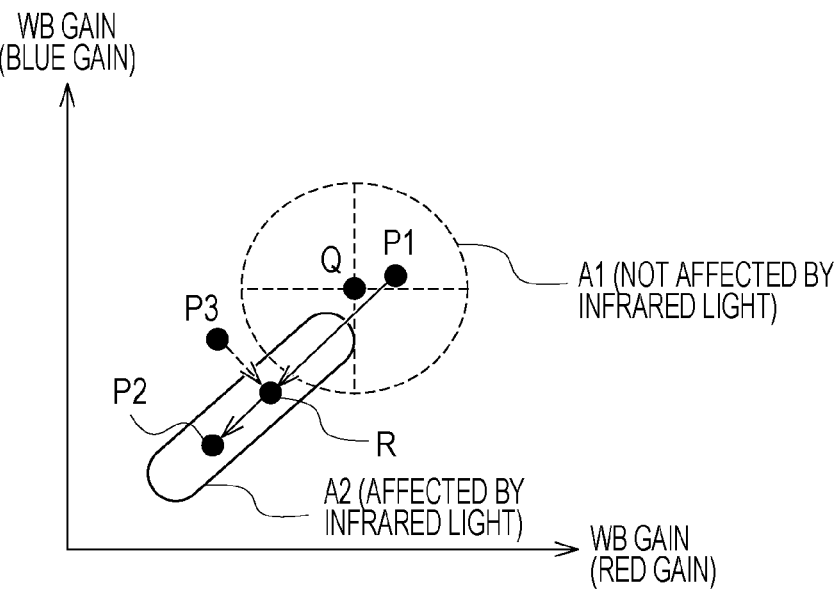
FIG. 5 is a diagram illustrating an example of a third WB gain control according to the first embodiment.

FIG. 5 is a diagram illustrating a third example of WB control according to the present embodiment.

In the third example of WB control illustrated in FIG. 5, the gain determination unit 105 sets the WB gain R at a WB gain closest to the WB gain P3 in the area A2 instead of setting the WB gain R at the predetermined WB gain in the area A2. Furthermore, the gain evaluation unit 104 may set the valid area A2 for the case where the color of the input image is affected by infrared light such that the valid area A2 is smaller than the valid area A1 for the case where the color of the input image is not affected by infrared light. When the color of the input image is affected by infrared light, the color of the subject may be significantly different from the true color, depending on the material of the subject, and thus if the white balance is controlled based on this color, the result will be a significant loss of the white balance. As shown in FIG. 5, when the color of the input image is affected by infrared light, reducing the valid area A2 for the WB gain can prevent a significant loss of white balance due to the application of an unexpected WB gain. Note that the smaller the valid area A2 is, the more often the calculated WB gain is outside the valid area A2. In this case, when the WB gain R is set to a fixed value, it is impossible to dynamically control the optimum white balance as the lighting conditions change.

To handle this situation, the WB gain R may be given by a WB gain that is closest to the WB gain P3 calculated outside the valid area A2 and inside the valid area A2. This makes it possible to dynamically control the optimal white balance in response to a change in lighting conditions.

Figure 6:
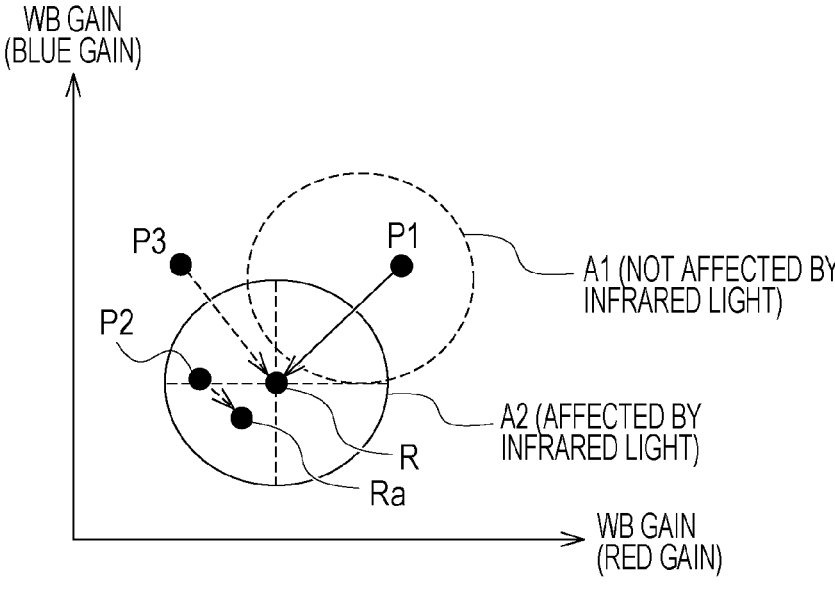
FIG. 6 is a diagram illustrating an example of a fourth WB gain control according to the first embodiment.

FIG. 6 is a diagram illustrating a fourth example of WB control according to the present embodiment.

In the fourth example of WB control illustrated in FIG. 6, the gain determination unit 105 sets the WB gain such that the WB gain P2 calculated in the state in which the color of the input image is affected by infrared light is replaced by a WB gain Ra that is within the valid area A2 of the WB gain for the case in which the color of the input image is affected by infrared light. The gain determination unit 105 may output the WB gain such that the WB gain P3 calculated in the state in which the color of the input image is affected by infrared light is replaced by the WB gain R that is within the valid area A2 of the WB gain for the case in which the color of the input image is affected by infrared light, and the resultant WB gain is output as the WB gain R. Note that the WB gain P2 is within the valid area A2 of the WB gain for the case in which the color of the input image is affected by infrared light, and the WB gain P3 is outside the valid area A2 of the WB gain for the case in which the color of the input image is affected by infrared light. The WB gain Ra is a predetermined WB gain that is set within the range of the valid area A2 to be used to appropriately control the white balance.

In order to dynamically control the white balance even when the color of the input image is affected by infrared light, it is necessary to set the valid area A2 large enough. However, if the valid area A2 is set large, the allowable range of the area of the WB gain increases, which may cause an unexpected WB gain to be applied, resulting in a loss of the white balance. In view of the above, in the fourth example of WB control, even if the calculated WB gain (for example, the WB gain P2) is within the valid area A2, the WB gain is replaced by a WB gain (for example, the WB gain Ra) that is within a more limited area and the resultant replaced WB gain is applied. This prevents an unexpected WB gain from being applied and causing a significant loss of the white balance, and makes it possible to properly perform the white balance control and achieve high color reproduction of a captured image even when the color of the input image is affected by infrared light.

As described above, the image processing apparatus according to the present embodiment can generate appropriate image data depending on whether the IRCF is in the inserted or removed position.

Second Embodiment

Next, an image processing apparatus according to a second embodiment is described with reference to FIG. 7. In the white balance control according to the second embodiment, the WB gain is changed gradually with time to prevent image quality degradation caused by an abrupt change in the WB gain.

The functional configuration of the image processing apparatus according to the present embodiment is the same as that according to the first embodiment, and therefore its illustration is omitted. Descriptions of the same functional units as those according to the first embodiment are omitted, and only functional units having functions different from those according to the first embodiment are described below.

The gain determination unit 105 acquires a WB gain from the gain calculation unit 102 and acquires the result of the evaluation of whether the WB gain is valid or not from the gain evaluation unit 104. Furthermore, the gain determination unit 105 determines the final WB gain based on the acquired information and the current WB gain stored in the gain determination unit 105. In the second embodiment, the gain determination unit 105 outputs the WB gain to the gain multiplication unit 106 such that the output WB gain changes gradually from the current WB gain to the final WB gain. Note that the current WB gain is the WB gain calculated in the past and set in the gain multiplication unit 106. In the case of moving images, the current WB gain is a WB gain applied to the input image one frame before.

Figure 7:
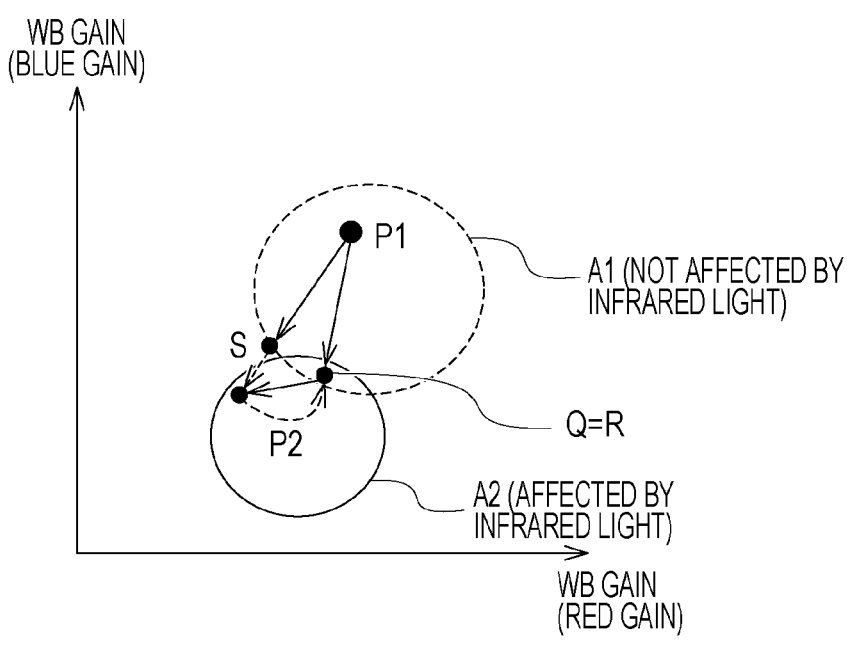
FIG. 7 is a diagram used to explain an operation of a gain determination unit according to a second embodiment.

FIG. 7 is a diagram used to explain the operation of the gain determination unit 105 according to the second embodiment.

In FIG. 7, the WB gain P1 is a current WB gain, and the WB gain P2 is a WB gain calculated by the gain calculation unit 102 when the color of the input image is affected by infrared light. In a case where the color of the input image is affected by infrared light, since the WB gain P2 is within the valid area A2, the gain determination unit 105 sets this WB gain P2 as the final WB gain.

Here, if the WB gain is changed abruptly, the color will change abruptly or, in some cases, the white balance will oscillate with repeated color changes in a short period of time, which results in deterioration of image quality. To prevent this, the gain determination unit 105 sequentially calculates a plurality of WB gains between the WB gains P1 and P2 and outputs the calculated WB gains such that the applied WB gain gradually changes from the WB gain P1 to the WB gain P2. That is, the gain determination unit 105 sets the target WB gain for the case in which the WB gain is gradually changed, and successively calculates and outputs the WB gain such that the WB gain applied to the input image (the current WB gain) gradually approaches the target WB gain.

More specifically, the gain determination unit 105 controls the target WB gain depending on whether the current WB gain belongs only to the valid area A1, the valid area A2, or the common area between the valid areas A1 and A2. For example, in a case where the current WB gain belongs to the valid area A1 excluding the common area of the valid areas A1 and A2 (for example, in a case where the current WB gain is at P1 shown in FIG. 7), the gain determination unit 105 sets the target WB gain to a WB gain belonging to the common area of the valid areas A1 and A2 (for example, at R in FIG.). The gain determination unit 105 then sets the WB gain such that the current WB gain gradually approaches the WB gain R.

After the current WB gain reaches the WB gain R belonging to the common area of the valid areas A1 and A2, the gain determination unit 105 sets the target WB gain to the originally calculated WB gain P2. That is, when the current WB gain belongs to the common area of the valid areas A1 and A2, the gain determination unit 105 sets the target WB gain to a WB gain belonging to the valid area A2 excluding the common area between the valid areas A1 and A2 (for example, to a WB gain at a position P2 shown in FIG. 2). The gain determination unit 105 then sets and outputs the WB gain such that the current WB gain changes gradually with time from the WB gain R to the final target WB gain P2.

In a case where the WB gain is changed gradually with time, as in the second embodiment, when the WB gain is changed, for example, from the WB gain P1 to the WB gain P2 in FIG. 7, it is common for the WB gain to change gradually on a straight line connecting the WB gains P1 and P2. However, when the WB gain is changed across different valid areas A1 and A2, there is a possibility that the straight line connecting the WB gains P1 and P2 goes outside into an area that is not included in either the valid area A1 or A2, as shown in FIG. 7. In this case, the changing of the WB gain will stop (converge) at the position of the gain S in FIG. 7 and will not reach the WB gain P2. This means that it may not be possible to control the white balance properly.

Therefore, in the present embodiment, the target WB gain is set to a first target WB gain belonging to the common area of the two valid areas until the current WB gain reaches the common area of the two valid areas from one valid area. After the current WB gain reaches the common area of the two valid areas, the target WB gain is switched from the first target WB gain to a second target WB gain (the final WB gain) belonging to the other valid area. This prevents the changing of the WB gain from converging before the WB gain reaches the final WB gain, which allows the white balance to be properly controlled.

The gain determination unit 105 may set the target WB gain to a WB gain belonging to the common area of the two valid areas at the time immediately after the color of the input image switches between being affected by infrared light and not being affected by infrared light, that is, immediately after the valid area of the WB gain switches. Alternatively, the gain determination unit 105 may output a WB gain that belongs to the common area of the two valid areas at the time immediately after the color of the input image switches between being affected by infrared light and not being affected by infrared light. At the time when the color of the input image switches between being affected by infrared light and not being affected by infrared light, the color of the input image changes significantly, and therefore it is difficult to perceive image quality degradation even if the white balance changes significantly. Therefore, the gain determination unit 105 changes the WB gain applied to the input image from the WB gain P1 to the WB gain R in FIG. 7, for example, at the time immediately after the color of the input image switches from being affected by infrared light to not being affected by infrared light. The gain determination unit 105 then changes the WB gain gradually from the WB gain R to the WB gain P2 in FIG. 7. This makes it possible to reduce the time required to reach the final target WB gain while preventing the WB gain from converging before the final target WB gain is reached.

Third Embodiment

Next, an image processing apparatus according to a third embodiment is described. In the previous embodiments described above, the white balance is controlled depending on whether or not the color of the input image is affected by infrared light sensed by the image sensor, and more specifically depending on whether the IRCF is in the inserted or removed position, whether the infrared lighting is turned on or off, whether the mode is switched by the user, or the like.

In contrast, in the third embodiment, the degree of the effect of infrared light on the color of the input image is detected, and the white balance is controlled depending on the detected degree of the effect of infrared light. Therefore, in the third embodiment, even in a case where the color of the input image is always affected by infrared light sensed by the image sensor, it is possible to properly perform the white balance control depending on the relative degree of the effect of the infrared light.

Figure 8:
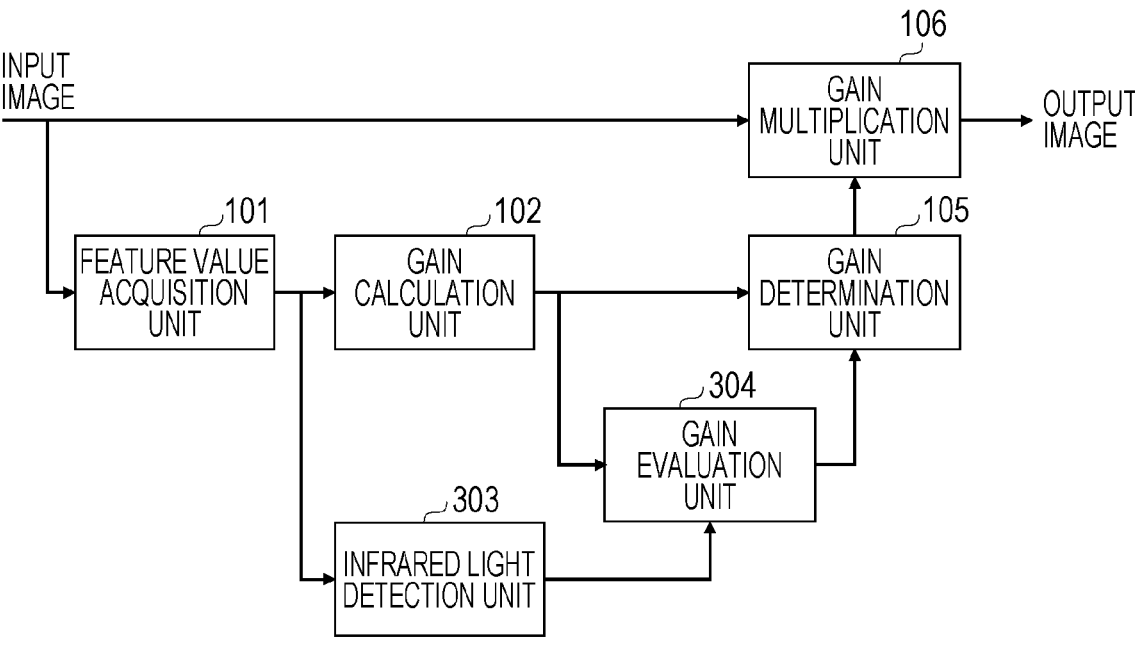
FIG. 8 is a diagram illustrating an example of a configuration of an image processing apparatus according to a third embodiment.

FIG. 8 is a diagram illustrating an example of a functional configuration of the image processing apparatus according to the third embodiment. The same functional units same as in the first embodiment are denoted by the same reference numerals, and their descriptions are omitted.

An infrared light detection unit 303 acquires a feature value related to the color of the input image from the feature value acquisition unit 101. The infrared light detection unit 303 detects the degree to which the color of the input image is affected by the infrared light sensed by the image sensor based on the feature value related to the color of the input image, and outputs the resultant detection result to a gain evaluation unit 304. More specifically, the infrared light detection unit 303 calculates the average color value of the input image, and detects that the larger the red component of the calculated color average value, the greater the effect of infrared light, while the smaller the red component of the calculated color average value, the smaller the effect of infrared light.

The gain evaluation unit 304 evaluates whether the WB gain acquired from the gain calculation unit 102 is valid or not according to the detection result acquired from the infrared light detection unit 303, and outputs the result of the valuation to the gain determination unit 105. More specifically, the gain evaluation unit 304 evaluates whether the WB gain is valid or not based on the evaluation criterion that is varied according to the degree of the effect of the infrared light on the color of the input image. For example, when the degree of the effect of the infrared light on the color of the input image is small, the gain evaluation unit 304 evaluates that the WB gain is valid if the WB gain is within a predetermined area (a valid area A20 in FIG. 9 described below). On the other hand, when the degree of the effect of the infrared light on the color of the input image is medium, the gain evaluation unit 304 evaluates that the WB gain is valid if the WB gain is within a predetermined area (a valid area A21 in FIG. 9 described below).

In a case where the degree of the effect of the infrared light on the color of the input image is large, the gain evaluation unit 304 evaluates that the WB gain is valid when the WB gain is within a predetermined area (A22). For example, the gain evaluation unit 304 sets the positions of the predetermined areas such that the larger the difference in the degree of effect of the infrared light on the color of the input image, the farther apart the predetermined areas are. The evaluation of whether the degree of the effect of the infrared light on the color of the input image is small, large, or medium, etc., may be performed, for example, based on whether the WB gain is within the respective valid areas or based on comparison with respective corresponding threshold values.

Figure 9:
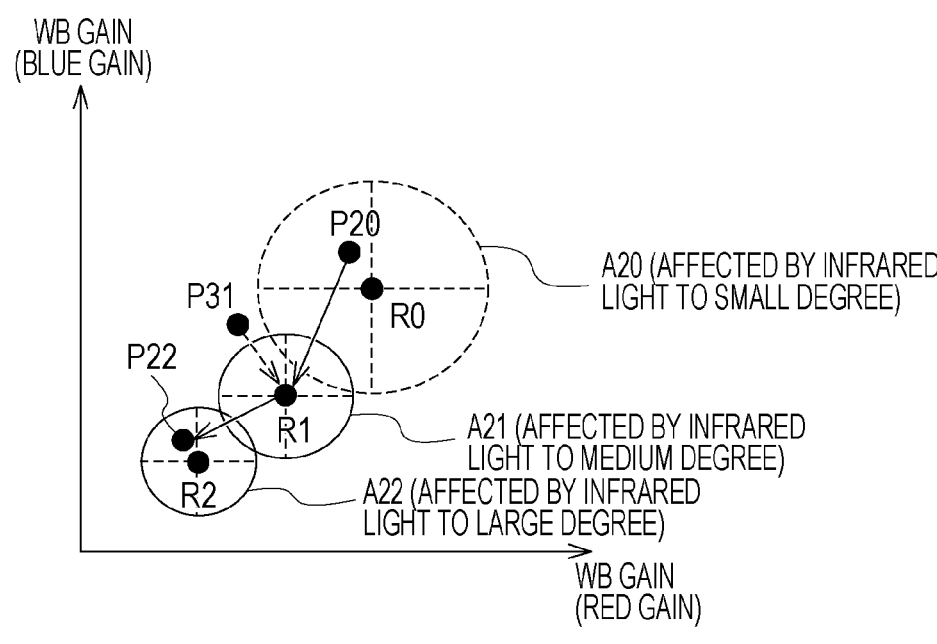
FIG. 9 is a diagram illustrating an example of a WB gain control according to the third embodiment.

FIG. 9 is a diagram used to explain operations of the gain evaluation unit 304 and the gain determination unit 105 according to the third embodiment.

In FIG. 9, an area A20 indicates a valid area for the case where the degree of effect of infrared light on the color of the input image is small (hereinafter, this area is referred to as the valid area A20). An area A21 in FIG. 9 indicates a valid area for the case where the degree of the effect of infrared light on the color of the input image is medium (hereinafter, this area is referred to as the valid area A21), and an area A22 in FIG. 9 indicates a valid area for the case where the degree of the effect of infrared light on the color of the input image is large (hereinafter, this area is referred to as the valid area A22). By applying a WB gain within an appropriate one of the valid areas to the input image, it is possible to output an image with the correct white balance.

In FIG. 9, a WB gain P20 is a valid WB gain calculated for the case where the degree of the effect of the infrared light on the color of the input image is small and therefore the area A20 is set as the valid area, and the WB gain P20 belongs to this valid area A20. In FIG. 9, a WB gain P22 is a valid WB gain calculated for the case where the degree of the effect of the infrared light on the color of the input image is large and therefore the area A22 is set as the valid area, and the WB gain P22 belongs to this valid area A22. In FIG. 9, a WB gain P31 is an invalid WB gain calculated for the case where the degree of the effect of the infrared light on the color of the input image is medium and therefore the area A21 is set as the valid area, and the WB gain P31 does not belong to this valid area A21. In FIG. 9, a WB gain R1 is a WB gain that is calculated for the case where the degree of the effect of the infrared light on the color of the input image is medium and therefore the area A21 is set as the valid area, and that is applied to the input image when the calculated WB gain is outside the valid area A21.

In the white balance control according to the present embodiment, the WB gain P20, the WB gain R1, and the WB gain P22 are applied when the degree of the effect of the infrared light on the input image is small, medium, or large, respectively. In the present embodiment, it is possible to set the optimal valid WB gain area according to the degree of effect of the infrared light on the color of the input image, and thus even in the case where the image sensor senses infrared light, it is possible to improve the color reproducibility of the captured image and prevent a significant loss of the white balance.

It is assumed above that the infrared light detection unit 303 calculates the average color value of the input image and detects that the greater the red component of the calculated color average, the greater the effect of infrared light, but this is not the only way to detect the degree of effect of infrared light. For example, the infrared light detection unit 303 may acquire information on the illuminance in the shooting environment and may detect that the lower the illuminance, the greater the effect of infrared light. The illuminance information can be calculated based on the brightness of the input image, based on exposure conditions, or based on readings from an illuminance sensor (not shown). Based on the distribution of color information in each area of the input image, the infrared light detection unit 303 may detect that the greater the local difference in the distribution of color information, the greater the effect of infrared light. This is because the greater the effect of infrared light, the less the color components of the subject and thus the color of the captured image is dominated by redness due to infrared light rather than the color of the subject, and a local change in the distribution of color information occurs near a red area.

As shown in FIG. 9, the gain evaluation unit 304 may control the valid WB gain area such that the larger the degree of the effect of the infrared light on the color of the input image, the smaller the size of the valid WB gain area. The greater the effect of infrared light on the color of the input image in a given situation, the less the true color components of the subject will be, and the amount of noise may increase due to insufficient sensitivity of the image sensor. As a result, an unexpected WB gain may be calculated, which may result in a significant loss of the white balance. In view of the above, the white balance may be controlled such that the greater the effect of the infrared light on the color of the input image, the smaller the size of the valid WB gain area, thereby preventing the application of an unexpected WB gain and controlling the white balance appropriately.

Fourth Embodiment

Next, an image processing apparatus according to a fourth embodiment is described. In the previous embodiments described above, even when the color of the input image is affected by infrared light sensed by the image sensor, the white balance is properly controlled to output a color image. In contrast, in the fourth embodiment, in the case where the color of the input image is affected by the infrared light sensed by the image sensor, the output image is switched between an image of chromatic color and an image of achromatic color according to the degree of the effect of the infrared light.

Figure 10:
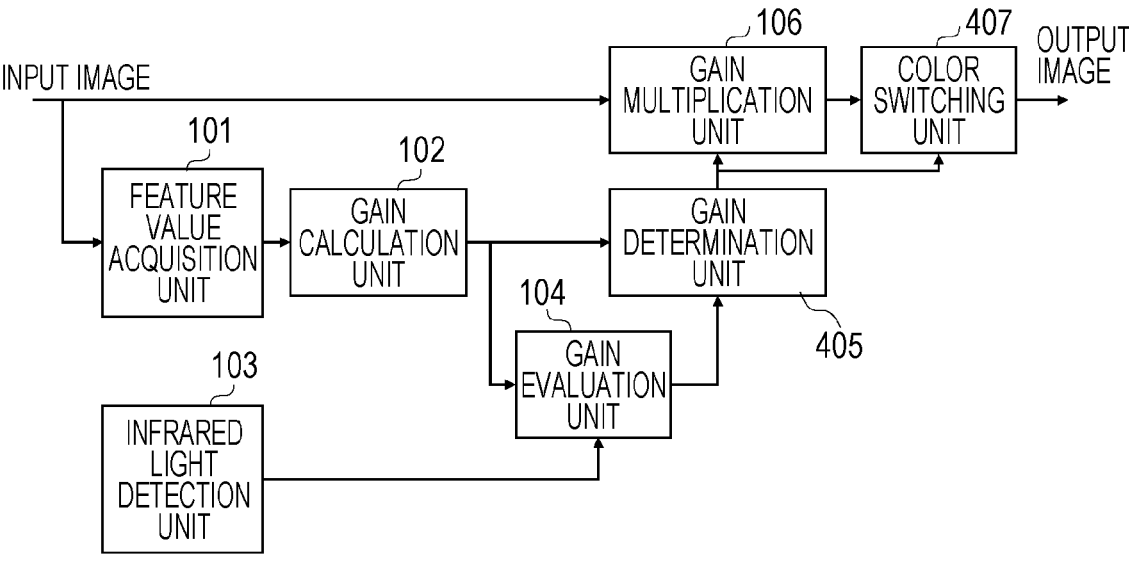
FIG. 10 is a diagram illustrating an example of a configuration of an image processing apparatus according to a fourth embodiment.

FIG. 10 is a diagram illustrating an example of a functional configuration of an image processing apparatus according to the fourth embodiment.

The same functional units same as in the first embodiment are denoted by the same reference numerals, and their descriptions are omitted.

A gain determination unit 405 acquires a WB gain from a gain calculation unit 102, and also acquires an evaluation result of whether the WB gain is valid or not from the gain evaluation unit 104. The gain determination unit 405 then determines a final WB gain, and outputs the determined final WB gain to the gain multiplication unit 106. Furthermore, the gain determination unit 405 determines whether the output image is to be chromatic or achromatic based on the WB gain calculated by the gain calculation unit 102, and outputs a determination result to a color switching unit 407. In a case where the gain determination unit 405 determines that the output image is to be achromatic, the gain determination unit 405 outputs the predetermined WB gain as the final WB gain to the gain multiplication unit 106.

When the color switching unit 407 acquires the result of the determination from the gain determination unit 405 as to whether the output image is to be chromatic or achromatic, if the determination is that the output image is to be achromatic, the color switching unit 407 converts the input image to an achromatic image and outputs the resultant image as the output image.

The WB gain control according to the fourth embodiment is described below with reference to FIG. 11.

Figure 11:
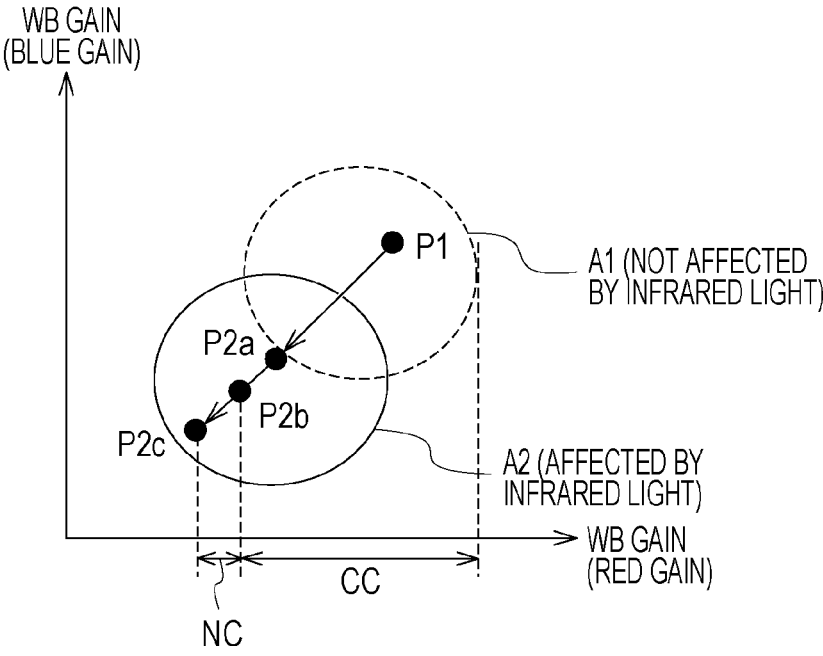
FIG. 11 is a diagram used to explain an operation of a gain determination unit according to the fourth embodiment.

In FIG. 11, an area A1 indicates a valid WB gain area for the case where the color of the input image is not affected by infrared light (hereinafter referred to as the valid area A1), and an area A2 indicates a valid WB gain area for the case where the color of the input image is affected by infrared light (hereinafter referred to as the valid area A2). A WB gain within either one of the valid areas is applied to the input image to produce the output image. The valid areas are designed such that when a WB gain within one of the valid areas is applied to the input image, the white balance is controlled appropriately without the resultant image appearing significantly unnatural to a user.

In FIG. 11, of WB gains P1, P2a, P2b, and P2c, the WB gain P1 is a WB gain calculated for the case where the color of the input image is not affected by infrared light.

The WB gains P2a, P2b, and P2c are the WB gains calculated for the case where the input image color is affected by infrared light.

Note that the lower the illuminance of the shooting environment and the greater the effect of infrared light on the color of the input image, the greater the reddish tint of the input image. Therefore, the WB gain used when the color of the input image is affected by infrared light is quite different from the WB gain used when the color of the input image is not affected by infrared light. That is, the WB gain P2a is a WB gain used when the effect of infrared light is relatively small, the WB gain P2b is a WB gain used when the effect of infrared light is medium, and the WB gain P2c is a WB gain used when the effect of infrared light is relatively large. When the effect of infrared light on the color of the input image is large, the true color components of the subject become relatively low, and therefore, depending on the sensitivity of the image sensor, it is difficult to achieve a sufficiently good color reproduction even when the white balance is properly controlled. In addition, the amount of noise may increase, and it may be difficult to control the white balance properly.

In view of the above, the gain determination unit 405 determines that the output image is to be chromatic when the WB gain (the red gain) is within a predetermined range (for example, a range CC greater than the WB gain P2b), and the gain determination unit 405 sets the final WB gain to the WB gain calculated by the gain calculation unit 102. This allows the white balance to be dynamically controlled according to the calculated WB gain. On the other hand, when the WB gain (the red gain) is within the predetermined range (for example, a range NC in which the WB gain is smaller than the WB gain P2b), the gain determination unit 405 determines that the output image is to be achromatic. When the sensitivity of the image sensor is sufficient, it is possible to improve the color reproducibility of the captured image by performing the WB gain control as described above to control the white balance according to the effect of infrared light on the color of the input image. On the other hand, when the sensitivity of the image sensor is insufficient, the WB gain is set to a fixed value and the output image is made achromatic, thereby preventing an image with a significant white balance error from being displayed.

It is assumed above that the gain determination unit 405 determines whether the color of the output image is to be achromatic or chromatic according to the red gain, but this is merely by way of example. Whether the output image is to be achromatic or chromatic may be determined according to the blue gain. Still alternatively, the gain determination unit 405 may acquire information about the illuminance of the shooting environment and determine that the color is to be achromatic when the illuminance is low and chromatic when the illuminance is high.

Fifth Embodiment

Next, an image processing apparatus according to a fifth embodiment is described. In the previous embodiments described above, the WB gain applied equally to the entire image is controlled. In contrast, in the fifth embodiment, the degree of the effect of infrared light on the color of the input image is evaluated for each pixel, and the WB gain is determined for each pixel based on the result of the pixel-by-pixel evaluation.

The functional configuration of the image processing apparatus according to the fifth embodiment is the same as that according to the first embodiment, and therefore no further illustration is provided. Descriptions of the same functional units as those according to the first embodiment are omitted, and only functional units having functions different from those according to the first embodiment are described below.

The gain multiplication unit 106 acquires a WB gain determined by the gain determination unit 105 and multiplies the input image by the acquired WB gain thereby generating an output image and outputting the resultant image. In the fifth embodiment, the gain multiplication unit 106 also has a function of calculating the luminance value for each pixel based on the acquired input image and setting the final WB gain for each pixel based on the calculated luminance value. That is, in the fifth embodiment, the gain multiplication unit 106 uses the WB gain set for each pixel based on the luminance value of each pixel as the final WB gain and applies it to the input image.

In the fifth embodiment, the gain multiplication unit 106 calculates the brightness of each pixel in the input image. The gain multiplication unit 106 then applies the WB gain determined by the gain determination unit 105 as the final WB gain to pixels whose brightness is less than a predetermined value. On the other hand, for pixels whose brightness is equal to or higher than the predetermined value, the gain multiplication unit 106 sets a third white balance control value as the predetermined white balance control value and applies it as the final WB gain. Note that in the present embodiment, the third white balance control value is a predetermined WB gain.

A use case assumed in the present embodiment is described with reference to FIG. 12.

Figure 12:
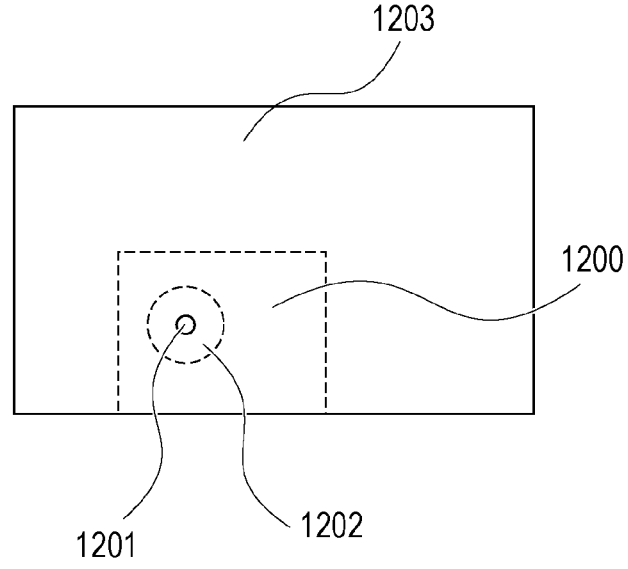
FIG. 12 is a diagram illustrating an example of an input image according to a fifth embodiment.

FIG. 12 illustrates a subject 1200 in a low-illuminance environment. The subject 1200 includes a light source 1201, such as an LED indicator. For example, let it be assumed that the subject 1200 is an apparatus installed in an unmanned facility and has an LED indicator that indicates the operation status of the apparatus. Let it be further assumed that the apparatus functioning as this subject 1200 emits light from the LED indicator for the purpose of alerting the user in case of some abnormality in the apparatus.

In such a situation, the effect of infrared light on the color of the input image is significant because the environment in which the subject 1200 exists is low in illuminance. However, in an area 1202 of the image around the LED indicator, the effect of infrared light on the color of the input image is small when the LED indicator emits visible light. In this case, in terms of the area ratio in the image, the size of an area 1203 in which the effect of infrared light on the color of the input image is large is larger. Therefore, if the white balance control is applied equally to the entire image, a WB gain appropriate for the image in the area 1203 in which the effect of infrared light is large is applied to the entire image. That is, the WB gain appropriate for the image of the area 1203 in which the effect of infrared light is large is also applied to the area 1202, around the LED indicator, in which the effect of infrared light is small. As a result, in the 1202 area around the LED indicator, the effect of infrared light is small and the white balance control may not be properly controlled, and the true color of the LED indicator may not be detected.

This means that an alert issued by the apparatus may be missed.

When there are two areas, one dominated by visible light (1202) and the other by infrared light (1203), as in the example described above, the area dominated by visible light, especially the area where a light source is located, will have high pixel values of high luminance. Therefore, in the present embodiment, the gain multiplication unit 106 evaluates an area of high luminance in the input image as an area dominated by visible light, while an area of low luminance in the input image is evaluated as an area dominated by infrared light. The gain multiplication unit 106 then sets the third white balance control value as the WB gain suitable for visible light for the area where visible light is dominant, that is, the high-luminance area. In the present embodiment, it is assumed that the third white balance control value suitable for visible light is a WB gain suitable for a light source of a specific color temperature, for example, a white light source with a color temperature of 5600K (Kelvin). On the other hand, the gain multiplication unit 106 applies a WB gain calculated for the case where the color of the input image is affected by infrared light to the area where infrared light is dominant, that is, the low-luminance area. That is, the gain multiplication unit 106 applies the WB gain acquired from the gain determination unit 105 to the pixels in the low-luminance area.

A WB gain correction process performed by the gain multiplication unit 106 according to the present embodiment is described below with reference to FIG. 13.

Figure 13:
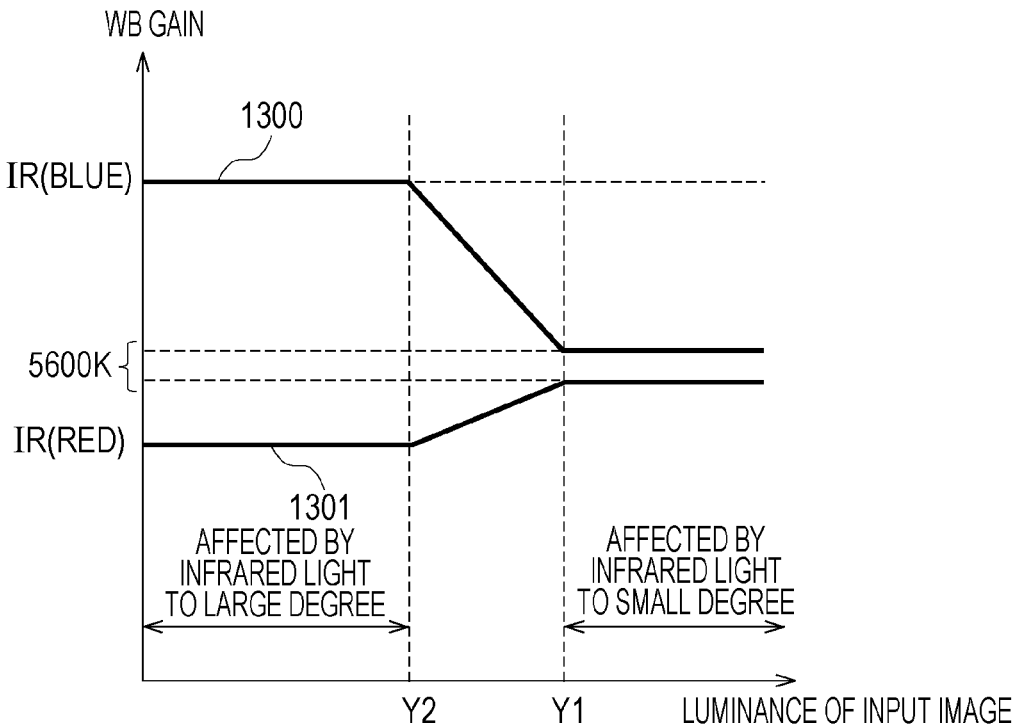
FIG. 13 is a diagram illustrating an example of a WB gain control according to the fifth embodiment.

FIG. 13 illustrates an example of a method of correcting the WB gain (a blue gain 1300 and a red gain 1301) by the gain multiplication unit 106 for each pixel.

When the brightness of a pixel in the input image is equal to or higher than a predetermined value, the gain multiplication unit 106 evaluates that the area is dominated by visible light and applies the WB gain appropriate for visible light. On the other hand, when the brightness of a pixel in the input image is lower than the predetermined value, the gain multiplication unit 106 evaluates that the area is dominated by infrared light and applies a WB gain suitable for the image containing infrared light. More specifically, when the luminance value of a pixel in the input image is equal to or greater than a first luminance threshold value (Y1), the gain multiplication unit 106 evaluates the area as an area dominated by visible light and applies a WB gain appropriate for visible light.

On the other hand, when the luminance value of a pixel in the input image is smaller than a second luminance threshold value (Y2), the gain multiplication unit 106 evaluates the area as an area dominated by infrared light and applies a WB gain suitable for the image containing infrared light. Here, for example, the WB gain suitable for visible light is the WB gain suitable for the white light source with a color temperate of 5600K (Kelvin) as described above. The WB gain suitable for the image containing infrared light is the WB gain acquired from the gain determination unit 105. The first luminance threshold value and the second luminance threshold value may be equal to each other, but in the present embodiment, it is assumed that the first and second luminance threshold values are different from each other, and the first luminance threshold value is greater than the second luminance threshold value.

That is, when the luminance value of a pixel in the input image is equal to or greater than the first luminance threshold value Y1, the gain multiplication unit 106 evaluates that the WB gain calculated by the gain calculation unit 102 is not valid. In this case, to the pixel whose luminance is equal to or higher than the first luminance threshold value Y1, the gain multiplication unit 106 applies a predetermined WB gain, for example, the WB gain suitable for a white light source with a color temperature of 5600K, as the third white balance control value. On the other hand, when the luminance value of a pixel in the input image is equal to or smaller than the second luminance threshold value Y2, the gain multiplication unit 106 evaluates that the WB gain calculated by the gain calculation unit 102 is valid. The gain multiplication unit 106 then applies the WB gain determined by the gain determination unit 105.

However, for example, if the WB gain is changed spatially abruptly, an unnatural image quality may result. In view of the above, for an area of the input image where the luminance values of pixels are smaller than the first luminance threshold value and higher than the second luminance threshold value (between Y1 and Y2), the gain multiplication unit 106 calculates a WB gain that is intermediate between the WB gain suitable for visible light and the WB gain suitable for the image containing infrared light. In this case, the gain multiplication unit 106 applies this intermediate WB gain to the pixels in the input image.

In the present embodiment, the intermediate WB gain is a WB gain obtained as a result of being gradually changed with time between the first and second luminance threshold values.

By performing the white balance control in the above-described manner, even when the input image includes two areas one of which is dominated by visible light and the other one is dominated by infrared light, the WB gain can be corrected for each pixel to obtain an output image with properly controlled white balance. Thus, in the use case described above, the color of the LED indicator can be correctly reproduced, which makes it possible to prevent the alert issued by the apparatus from being missed.

Sixth Embodiment

Next, an image processing apparatus according to a sixth embodiment is described. In the previous embodiments described above, the evaluation criterion for evaluating whether the WB gain is valid or not is changed according to the presence or absence of the effect of infrared light. In contrast, in the sixth embodiment, the white balance control value calculated at the time when the presence or absence of the effect of infrared light is switched is evaluated to be valid regardless of the evaluation criterion.

The functional configuration of the image processing apparatus according to the sixth embodiment is substantially the same as that according to the first embodiment, and therefore no further illustration is provided. Descriptions of the same functional units as those according to the first embodiment are omitted, and only functional units having functions different from those according to the first embodiment are described below.

In the sixth embodiment, the gain calculation unit 102 outputs a white balance control value (a WB gain) that is calculated based on the result of the detection by the infrared light detection unit 103 in a manner different from the previous embodiments. More specifically, in the sixth embodiment, at the time when a change occurs in the detection result acquired from the infrared light detection unit 103, the gain calculation unit 102 calculates the WB gain using a method different from the methods used at the other times. For example, the other method of WB gain calculation is to calculate the WB gain such that the input image is assumed to be of an achromatic subject and the WB gain is calculated such that the integral or average value of the colors in the input image is a value representing an achromatic color. Hereinafter, this method of calculating the WB gain will be referred to as "white setting".

The infrared light detection unit 103 detects the effect of infrared light on the color of the input image. In the sixth embodiment, the result of detection by the infrared light detection unit 103 is sent not only to the gain evaluation unit 104 but also to the gain calculation unit 102.

The gain evaluation unit 104 evaluates whether the WB gain acquired from the gain calculation unit 102 is valid or not based on the detection result acquired from the infrared light detection unit 103, and outputs the evaluation result to the gain determination unit 105. In the sixth embodiment, based on the detection result provided by the infrared light detection unit 103, the gain evaluation unit 104 evaluates whether the WB gain is valid or not based on a different evaluation criterion. That is, in the sixth embodiment, the gain evaluation unit 104 evaluates that the WB gain acquired from the gain calculation unit 102 is valid at the time when a change occurs in the detection result acquired from the infrared light detection unit 103.

The gain determination unit 105 acquires the WB gain from the gain calculation unit 102, the evaluation result of whether the WB gain is valid or not from the gain evaluation unit 104, determines the final WB gain, and outputs the final WB gain to the gain multiplication unit 106. In the sixth embodiment, in a case where the WB gain from the gain calculation unit 102 is the WB gain calculated in the white setting process and evaluated as valid by the gain evaluation unit 104 at the time when the infrared light detection result has changed, the gain determination unit 105 fixes the WB gain at the WB gain described above. More specifically, the gain determination unit 105 according to the sixth embodiment continues to output the fixed WB gain over a period from when the IRCF is removed to when the IRCF is reinserted and the detection result of the infrared light detection unit 103 changes.

Figure 14:
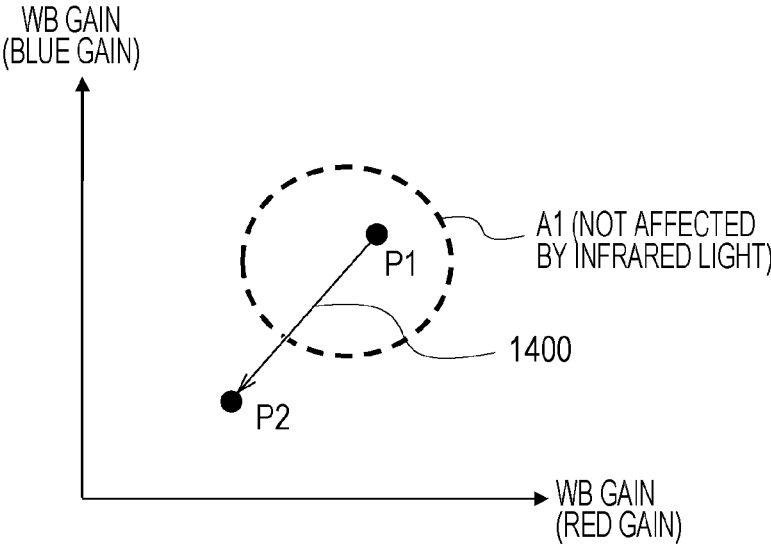
FIG. 14 is a diagram illustrating an example of a WB gain control according to a sixth embodiment.

FIG. 14 is a diagram used to explain the operation of the gain determination unit 105 according to the sixth embodiment.

In FIG. 14, an area A1 indicates a valid WB gain area (a valid area A1) for a case where the color of the input image is not affected by infrared light. For example, when the color of the input image is not affected by infrared light, a WB gain P1 within the valid area A1 is applied to the input image to produce the output image. On the other hand, in the sixth embodiment, a WB gain P2 in FIG. 14 indicates a WB gain calculated at the time when a change occurs in the presence or absence of the effect of infrared light on the color of the input image. For example, the WB gain P2 is calculated by the white setting process described above. That is, in the sixth embodiment, the white setting process is performed at the time when a change occurs in the presence or absence of the effect of infrared light on the color of the input image. In the sixth embodiment, the WB gain P2 calculated at the time when a change occurs in the presence or absence of the effect of infrared light on the color of the input image is evaluated as valid and applied to the input image. That is, in the sixth embodiment, the white setting process is performed at the time when the IRCF is inserted or removed, and the WB gain calculated as a result of the white setting process is applied. This makes it possible to control the white balance according to the effect of infrared light on the color of the input image, thereby improving the color reproduction of the output image.

In the present embodiment, the validity of the WB gain calculated at the time when a change occurs in the presence or absence of the effect of infrared light on the color of the input image is evaluated either unconditionally or based on a condition that is looser than usual. Therefore, the method of calculating the WB gain is not limited to the white setting process described above. In the general white setting process, the WB gain is fixed to the value obtained as a result of the white setting process, but the WB gain may or may not be fixed. In the present embodiment, after the WB gain P2 in FIG. 14 is set, the area A1 remains as the valid WB gain area. However, if the color of the input image is affected by infrared light, a WB gain that is not included in the area A1 is calculated. That is, in this case, the calculated WB gain is invalid, and therefore the current white balance is maintained. As a result, the WB gain is fixed at the WB gain P2.

Seventh Embodiment

Next, an image processing apparatus according to a seventh embodiment is described. In the previous embodiments described above, the evaluation criterion for evaluating whether the WB gain is valid or not is changed according to the presence or absence of the effect of infrared light and the degree of the effect of infrared light. In contrast, the seventh embodiment provides an example in which the evaluation criterion for evaluating whether the WB gain is valid or not is changed according to the setting of the "correction level," which indicates the degree to which the effect of infrared light is corrected. Furthermore, in the seventh embodiment, the correction amount by which the WB gain evaluated as valid is corrected is changed according to the setting of the "correction level", which defines the degree to which the effect of infrared light is to be corrected.

The functional diagram of the image processing apparatus according to the seventh embodiment is generally the same as that according to the first embodiment illustrated in FIG. 1, but the image processing apparatus according to the seventh embodiment further includes an adjustment unit 501

Figure 15:
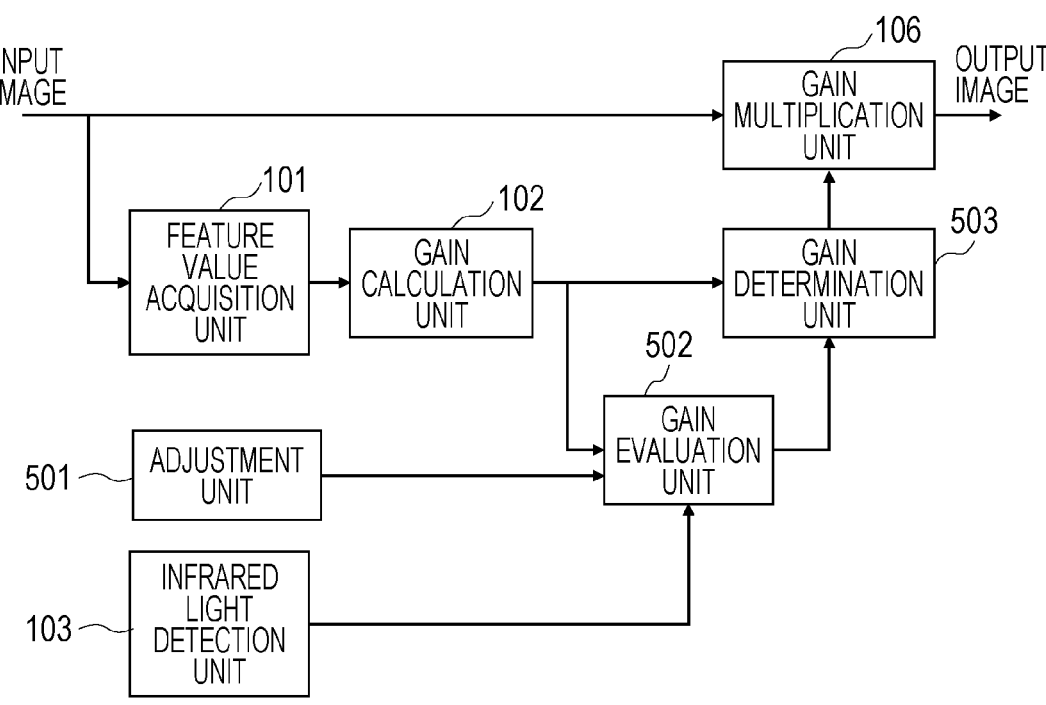
FIG. 15 is a diagram illustrating an example of a configuration of an image processing apparatus according to a seventh embodiment.
Figure 16:
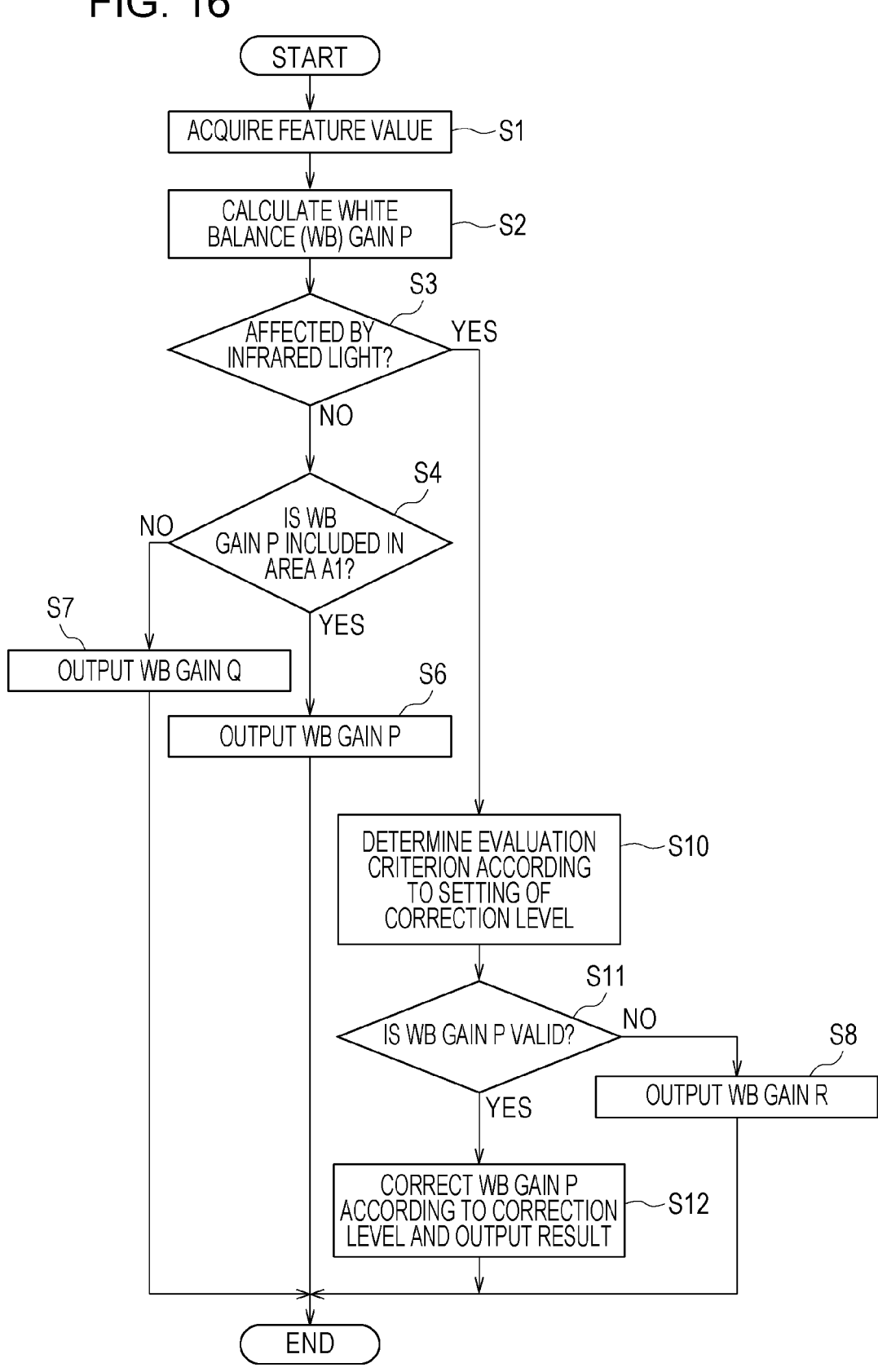
FIG. 16 is a flowchart illustrating a flow of image processing according to the seventh embodiment.

(as shown in FIG. 15) that determines the correction level for correcting the effect of infrared light on the color of the input image. FIG. 16 is a flowchart illustrating an example of a flow of a main part of image processing performed by the image processing apparatus according to the seventh embodiment.

Explanations of the same functional units and the same processing steps as in the first embodiment are omitted, and only operations and processing steps of functional units different from those in the first embodiment are described below.

The adjustment unit 501 sets the correction level that defines the degree to which the effect of infrared light on the color of the input image (the captured image) is to be corrected. For example, in the case where the color of the input image is affected by infrared light, the correction level is usually set to "medium" as the appropriate level. However, depending on the shooting environment and the type of the subject, it may be desirable to set the correction level to "low" or "high". Therefore, in the seventh embodiment, the adjustment unit 501 adjusts the correction level according to the shooting environment, the type of the subject, and/or the like. That is, in the seventh embodiment, the adjustment unit 501 adjusts the correction level according to the shooting environment, the type of the subject, and/or the like, or the adjustment unit 501 adjusts the correction level more finely. For example, the correction level may be set by the user or may be changed automatically based on one or more factors including the sensitivity of the image sensor, the exposure at the time of capture, the shutter speed, the capture mode, the brightness and color of the image, the distance to the subject, and the subject automatically detected from the image. As described above, the correction level is adjusted according to the use cases such as the shooting environment, the subject type, or user preference.

As with the gain evaluation unit 104 or the like according to the first embodiment, the gain evaluation unit 502 determines the evaluation criterion for evaluating whether the WB gain (the first white balance control value) acquired from the gain calculation unit 102 is valid or not, based on the detection result acquired from the infrared light detection unit 103.

In the seventh embodiment, as illustrated in the flowchart of FIG. 16, in a case where it is evaluated in S3 that the color of the input image is affected by infrared light, the gain evaluation unit 502 proceeds to S10. Then, in S10, the gain evaluation unit 502 determines an evaluation criterion for evaluating whether the WB gain acquired from the gain calculation unit 102 is valid or not, according to the "correction level" which defines the degree to which the effect of infrared light is corrected.

More specifically, when there is an effect of infrared light on the color of the input image (for example, when the IRCF is removed from the optical path), the gain evaluation unit 502 evaluates whether the WB gain is valid or not based on the evaluation criterion that varies depending on the setting of the degree to which the effect of infrared light on the white balance is to be corrected. That is, the gain evaluation unit 502 sets the evaluation criterion such that the "higher" the correction level is, the greater the difference of the applied WB gain from the WB gain used when there is no effect of infrared light on the color of the input image (for example, when the IRCF is inserted in the optical path). Conversely, the gain evaluation unit sets the evaluation criterion such that the "lower" the correction level is, the closer the applied WB gain is to the WB gain used when there is no effect of infrared light on the color of the input image even if there is a significant effect of infrared light on the color of the input image.

For example, the gain evaluation unit 502 sets the positions of the predetermined areas such that the higher the "correction level" setting, the farther away the predetermined areas are. That is, the gain evaluation unit 502 determines the evaluation criterion such that the higher the "correction level" setting, the greater the difference between the WB gain used when there is no effect of infrared light on the color of the input image and the WB gain that the gain evaluation unit 502 evaluates as valid. On the other hand, the gain evaluation unit 502 determines the evaluation criterion such that the lower the "correction level" setting, the smaller the difference between the WB gain used when there is no effect of infrared light on the color of the input image and the WB gain that the gain evaluation unit 502 determines as valid.

Next, in S11, the gain evaluation unit 502 evaluates whether the WB gain (the first white balance control value) acquired from the gain calculation unit 102 is valid or not using the evaluation criterion determined according to the correction level setting, and outputs the evaluation result to the gain determination unit 503. For example, in the case where the "correction level" is set to "low," the gain evaluation unit 502 evaluates the WB gain as valid if the WB gain is within a predetermined area (a valid area A30 described below with reference to FIG. 17). In the case where the "correction level" is set to "medium," the gain evaluation unit 502 evaluates the WB gain as valid if the WB gain is within a predetermined area (a valid area A31 described below with reference to FIG. 17). When the "correction level" is set to "high," the gain evaluation unit 502 evaluates the WB gain as valid if the WB gain is within a predetermined area (a valid area A32 described below with reference to FIG. 17).

The gain determination unit 503 determines the final white balance control value (the final WB gain) to be multiplied to the input image by the gain multiplication unit 106. The gain determination unit 503 determines the final WB gain based on the result of the evaluation by the gain evaluation unit 502 or the evaluation criterion used by the gain evaluation unit 502. In the seventh embodiment, when the WB gain is evaluated as valid in S11, the gain determination unit 503 proceeds to S12. In S12, the gain determination unit 503 receives from the gain evaluation unit 502 the set value of "correction level", which defines the degree to which the effect of infrared light is to be corrected. The gain determination unit 503 corrects the WB gain (the first white balance control value) acquired from the gain calculation unit 102 according to the correction level setting and outputs the corrected WB gain to the gain multiplication unit 106. That is, in the case where the evaluation result obtained from the gain evaluation unit 502 indicates that the WB gain is valid, the gain determination unit 503 according to the seventh embodiment outputs to the gain multiplication unit 106 the first white balance control value calculated by the gain calculation unit 102 and corrected according to the "correction level" setting.

For example, the gain determination unit 503 corrects the WB gain acquired from the gain calculation unit 102 such that the "higher" the "correction level" setting, the greater the blue gain component of the WB gain. On the other hand, the gain determination unit 503 corrects the WB gain acquired from the gain calculation unit 102 such that the "lower" the "correction level" setting, the smaller the WB gain, and outputs the resultant WB gain. When the "correction level" setting is "low", the WB gain acquired from the gain calculation unit 102 may be output directly without correction. On the other hand, when the evaluation result from the gain evaluation unit 502 indicates that the WB gain is not valid, the gain determination unit 503 outputs in S8 a predetermined white balance control value (a second white balance control value) to the gain multiplication unit 106 as the final WB gain in S8. The second white balance control value is, for example, the WB gain stored in the storage apparatus (not shown) as described in the first embodiment. The WB gain stored in the storage apparatus is, for example, the WB gain used as the final WB gain in the past or the predetermined WB gain in the current predetermined area determined by the gain evaluation unit 502.

In the above-described example of the seventh embodiment, the correction amount for the WB gain is determined according to the "correction level," but the method of determining the correction amount for the WB gain is not limited thereto. For example, the correction amount for the WB gain may be determined according to the evaluation criterion determined by the gain evaluation unit 502.

Figure 17:
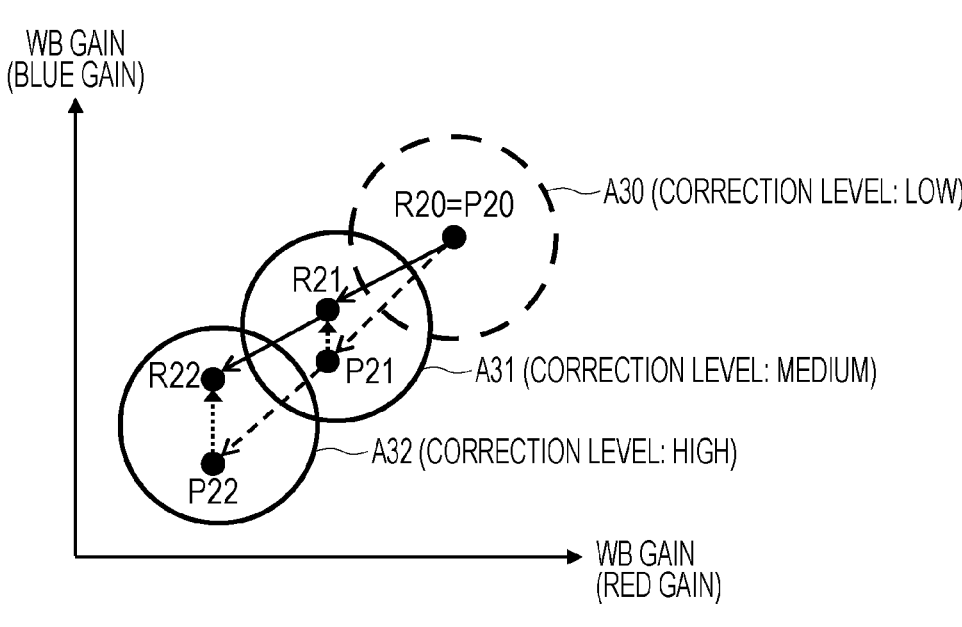
FIG. 17 is a diagram illustrating an example of a WB gain control according to the seventh embodiment.

FIG. 17 is a diagram used to explain the operation in the gain evaluation unit 502 and the gain determination unit 503 according to the seventh embodiment.

The area A30 in FIG. 17 indicates a valid area when "low" is set as the "correction level" which defines the degree to which the effect of infrared light on the input image is to be corrected (hereinafter, this area is simply referred to as the valid area A30).

The area A31 in FIG. 17 indicates a valid area when the "correction level" is set to "medium" (hereinafter, referred to as the valid area A31), and the area A32 in FIG. 17 indicates a valid area when the "correction level" is set to "high" (hereinafter, referred to as the valid area A32). The WB gain P20 in FIG. 17 indicates a valid WB gain belonging to the valid area A30, calculated when the "correction level" is set to "low" and the valid area is set to A30. The WB gain P21 in FIG. 17 indicates a valid WB gain belonging to the valid area A31, calculated when the "correction level" is set to "medium" and the valid area is set to A31. The WB gain P22 in FIG. 17 indicates a valid WB gain belonging to the valid area A32, calculated when the "correction level" is set to "high" and the valid area is set to A32. The WB gain R20 in FIG. 17 indicates a WB gain resulting from the correction of the WB gain P20 calculated when the "correction level" is set to "low" and the valid area is set to A30. In this example, when the "correction level" is set to "low", the WB gain is not corrected and thus R20=P20. The WB gain R21 in FIG. 17 indicates a WB gain resulting from the correction of the WB gain P21 calculated when the "correction level" is set to "medium" and the valid area is set to A31. The WB gain R22 in FIG. 17 indicates a WB gain resulting from the correction of the WB gain P22 calculated when the "correction level" is set to "high" and the valid area is set to A32.

In the seventh embodiment, the WB gains R20, R21, and R22 are obtained by correcting the WB gains P20, P21, and P22, respectively, calculated based on the feature value of the input image and the valid area set according to the "correction level," and the resultant WB gains R20, R21, and R22 are used as the final WB gains. The amount of the WB gain correction is determined according to the "correction level", but the correction amount may set to a constant value depending on the "correction level", or it may be an intermediate correction amount between a plurality of correction amounts corresponding to a plurality of "correction levels". For example, in a case where a WB gain is calculated to be halfway between P20 and P21 in FIG. 17, the calculated WB gain may be corrected to be halfway between R20 and R21.

When the white balance is controlled based on the average color information of the input image, the white balance can be properly controlled when the degrees of the effect of infrared light on subjects in the input image are equal, such as in a case where there is little difference in infrared light reflectance among the subjects. However, if the white balance is corrected based on the average color information of the input image, for example, if there is a large difference in the infrared light reflectance among the subjects, the white balance will be under-corrected for subjects that are strongly affected by infrared light and over-corrected for subjects that are less affected by infrared light.

In the seventh embodiment, the white balance is corrected according to the "correction level" setting in addition to the average color information of the input image. That is, when the "correction level" setting is "high," the amount of white balance correction is increased, and when the "correction level" setting is "low," the amount of white balance correction is decreased. This allows the white balance control to be performed to give priority to a subject of high importance, such as a subject of interest, and thus improve the color reproduction of the output image of the subject of interest even when there is a large difference in infrared reflectance among the subjects.

Although the image processing apparatus according to the embodiments described above is assumed by way of example to be applied to an imaging apparatus, the image processing apparatus may be realized by an information processing apparatus (a computer) such as a personal computer, a smartphone, or the like connected to the imaging apparatus. In this case, the imaging apparatus outputs to the computer the raw data captured by the imaging unit and also information including the shooting parameters indicating the exposure time, frame rate, exposure value, etc., and information indicating whether or not the IRCF is used, that is, whether or not there is an effect of infrared light on the color of the input image. The information indicating whether there is an effect of infrared light can be entered by the user. The computer then performs image processing similar to that described in the previous embodiments. In this example, the computer executes the software program code that implements the image processing according to the present embodiment.

Figure 18:
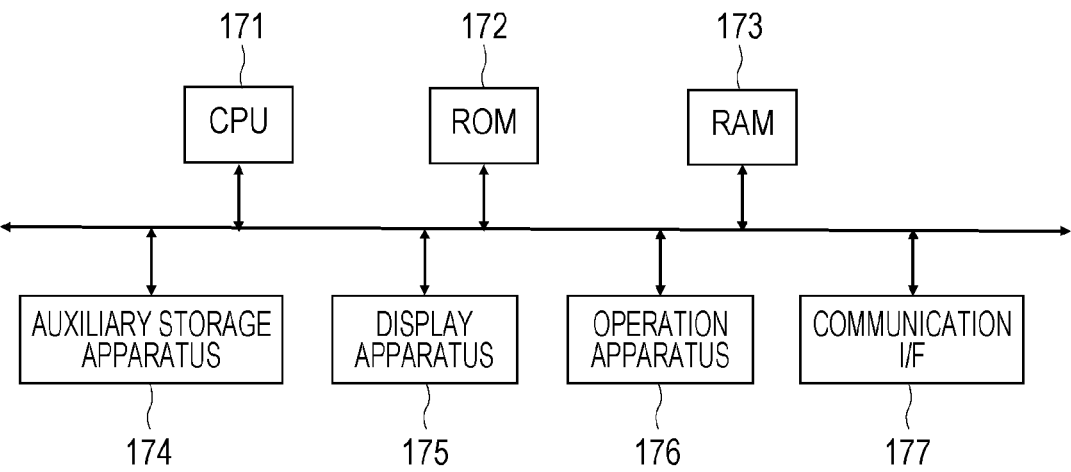
FIG. 18 is a diagram illustrating an example of a hardware configuration applicable to an image processing apparatus.

FIG. 18 illustrates an example of a hardware configuration (that is, a computer configuration) that may be applied to an image processing apparatus in each of the foregoing embodiments. In this configuration shown in this FIG. 18, the computer is connected, by way of example, to a camera or other imaging apparatus, but the configuration shown in this FIG. 18 may be built into the imaging apparatus. As shown in FIG. 18, the computer that realizes the image processing apparatus in each embodiment includes a CPU 171, a ROM 172, a RAM 173, an auxiliary storage apparatus 174, a display apparatus 175, an operation apparatus 176, a communication I/F 177, a bus, and so on.

The CPU 171 controls the entire computer using a computer program and data stored in the ROM 172 or the RAM 173, and also performs the white balance control, etc., described above. The image processing apparatus according to the present embodiment may have one or more pieces of dedicated hardware different from the CPU, and the one or more pieces of dedicated hardware may perform at least part of the processing by the CPU. Examples of dedicated hardware include ASICs (application-specific integrated circuits), FPGAs (field programmable gate arrays), and DSPs (digital signal processors).

The ROM 172 stores programs and the like that do not need to be changed. The RAM 173 temporarily stores programs and data supplied from the auxiliary storage apparatus 174 and data supplied from outside via the communication I/F 177. The auxiliary storage apparatus 174 includes a hard disk drive or the like and stores various data, such as image data, shooting parameters, and information indicating whether or not there is an effect of infrared light.

The display unit 175 includes, for example, an LCD or LED display, and displays a GUI or other information for the user to operate the image processing apparatus. The operation apparatus 176 includes, for example, a keyboard, a mouse, a joystick, a touch panel, etc., and accepts operations from the user and inputs various instructions to the CPU 171. The CPU 171 also functions as a display control unit to control the display apparatus 175 and as an operation control unit to control the operation apparatus 176. The communication I/F 177 is used for communication with apparatuses external to the image processing apparatus. For example, in a case where the image processing apparatus is further wired to an external apparatus, a communication cable is connected to the communication I/F. In a case where the image processing apparatus has a function of wirelessly communicating with an external apparatus, the communication I/F 177 includes an antenna. The bus connects various parts of the image processing apparatus and transmits information between them. In the present embodiment, the external apparatus connected to the image processing apparatus is the imaging apparatus described above or another information processing apparatus or the like. Although the display apparatus 175 and the operation apparatus 176 are assumed to exist inside the image processing apparatus, at least one of the display apparatus 175 and the operation apparatus 176 may exist as a separate apparatus outside the image processing apparatus. The image processing apparatus does not necessarily have to include the display unit 175 and the control unit 176.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-071728, filed Apr. 25, 2022, which is hereby incorporated by reference herein in its entirety.

What is claimed is:

1. An image processing apparatus comprising:

at least one processor; and a memory coupled to the at least one processor and storing instructions that, when executed by the processor, cause the processor to function as:

an adjustment unit configured to determine a correction level defining a degree to which a color of an input image is to be corrected;

a calculation unit configured to calculate a first white balance control value based on the input image;

an infrared light detection unit configured to determine whether the color of the input image is affected by an infrared light according to whether an infrared light cut-off filter is inserted;

an evaluation unit configured to evaluate whether or not the first white balance control value is valid; and a setting unit configured to set a second white balance control value based on a result of the evaluation by the evaluation unit, wherein in a case where the infrared light detection unit determines the color of the input image is affected by the infrared light, the evaluation unit determines an evaluation criterion for evaluating whether or not the first white balance control value is valid based on the correction level determined by the adjustment unit.

2. The image processing apparatus according to claim 1, further comprising a correction unit configured to correct the first white balance control value, wherein the correction unit corrects the first white balance control value based on at least one of the correction level determined by the adjustment unit and the evaluation criterion determined by the evaluation unit.

3. The image processing apparatus according to claim 1, wherein in a case where the evaluation unit evaluates that the first white balance control value is valid, the setting unit sets the first white balance control value as a control value to be applied to the input image.

4. The image processing apparatus according to claim 1, wherein the evaluation unit determines the evaluation criterion based on the correction level.

5. The image processing apparatus according to claim 4, wherein the evaluation unit determines the evaluation criterion such that the larger the correction level, the larger the difference between the evaluation criterion in a case where the color of the input image is affected by infrared light and the evaluation criterion in a case where the color of the input image is not affected by infrared light.

6. The image processing apparatus according to claim 1, wherein the evaluation unit evaluates that the first white balance control value is valid in a case where the first white balance control value is within a predetermined valid range, and evaluates that the first white balance control value is not valid in a case where the first white balance control value is not within the predetermined valid range.

7. The image processing apparatus according to claim 6, wherein the evaluation unit determines the evaluation criterion such that the larger the correction level, the smaller the predetermined valid range.

8. The image processing apparatus according to claim 6, wherein in a case where the evaluation unit evaluates that the first white balance control value is valid, the setting unit sets a white balance control value that is different from the first white balance control value and included within the predetermined valid range.

9. The image processing apparatus according to claim 6, wherein the setting unit sets a white balance control value included in a common area between a first area and a second area at a time when the predetermined valid range is changed from a first area to a second area.

10. The image processing apparatus according to claim 6, further comprising a detection unit configured to detect an effect of infrared light on the input image, wherein the evaluation unit evaluates that the first white balance control value that is not included in the predetermined valid range is valid at a time when the detection result provided by the detection unit changes.

11. The image processing apparatus according to claim 10, wherein during a period from a time when the first white balance control value not included in the predetermined valid range is evaluated to be valid when the detection result provided by the detection unit changes until a time when the detection result provided by the detection unit changes again, the setting unit sets the first white balance control value that is not included within the predetermined valid range and calculated at a time when the detection result provided by the detection unit changes.

12. The image processing apparatus according to claim 10, wherein the calculation unit calculates a first white balance control value at a time when a detection result provided by the detection unit changes, in a manner different from a manner used in a period in which the detection result provided by the detection unit does not change.

13. The image processing apparatus according to claim 12, wherein the calculation unit calculates the first white balance control value by being given by a white balance control value calculated when a subject included in the input image is achromatic at a time when the detection result provided by the detection unit changes.

14. The image processing apparatus according to claim 1, wherein in a case where the white balance control value is changed, the setting unit changes the white balance control gradually with time.

15. The image processing apparatus according to claim 1, wherein the setting unit further comprises an application unit configured to apply the white balance control value to the input image to generate an output image so as to be given by the input image whose white balance is controlled.

16. The image processing apparatus according to claim 15, further comprising a color conversion unit configured to convert a chromatic image to an achromatic image, wherein the setting unit determines whether the output image is to be chromatic or achromatic based on a degree of an effect of infrared light on a color of the input image.

17. The image processing apparatus according to claim 15, wherein the setting unit calculates brightness of each pixel included in the input image and applies a third white balance control value to a pixel whose brightness is equal to or greater than a predetermined value.

18. An image processing method comprising:

determining, by at least one processor, a correction level defining a degree to which a color of an input image is to be corrected;

calculating, by the at least one processor, a first white balance control value based on the input image;

determining, by the at least one processor, whether the color of the input image is affected by an infrared light according to whether an infrared light cut-off filter is inserted;

determining, by the at least one processor, in a case where the color of the input image is determined to be affected by the infrared light, an evaluation criterion for evaluating whether the first white balance control value is valid or not based on the determined correction level;

evaluating, by the at least one processor, whether or not the first white balance control value is valid according to the evaluation criterion; and setting, by the at least one processor, a second white balance control value based on a result of the evaluation.

19. A non-transitory computer-readable storage medium storing a program for causing a computer to perform the image processing method according to claim 18.

\* \* \* \* \*